Sept. 10, 1957 R. A. CHRISTIAN ET AL 2,805,748
FRONT FEED CARRIAGES FOR ACCOUNTING MACHINES
Original Filed Dec. 6, 1947 19 Sheets-Sheet 10
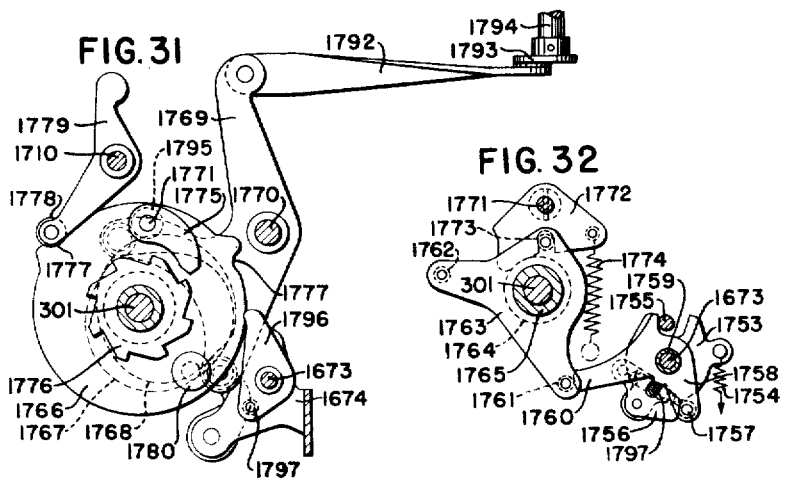
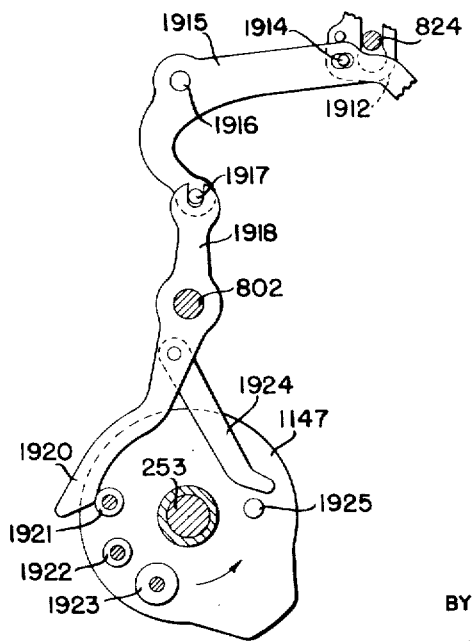
INVENTORS
RAYMOND A. CHRISTIAN
ARTHUR R. COLLEY
JAMES H. CRAWFORD
JESSE R. GANGER &
ROBERT C. MITCHELL
BY Earl Beust
Richard Van Buren
THEIR Attorneys Sept. 10, 1957 R. A. CHRISTIAN ET AL 2,805,748
FRONT FEED CARRIAGES FOR ACCOUNTING MACHINES
Original Filed Dec. 6, 1947 19 Sheets-Sheet 11

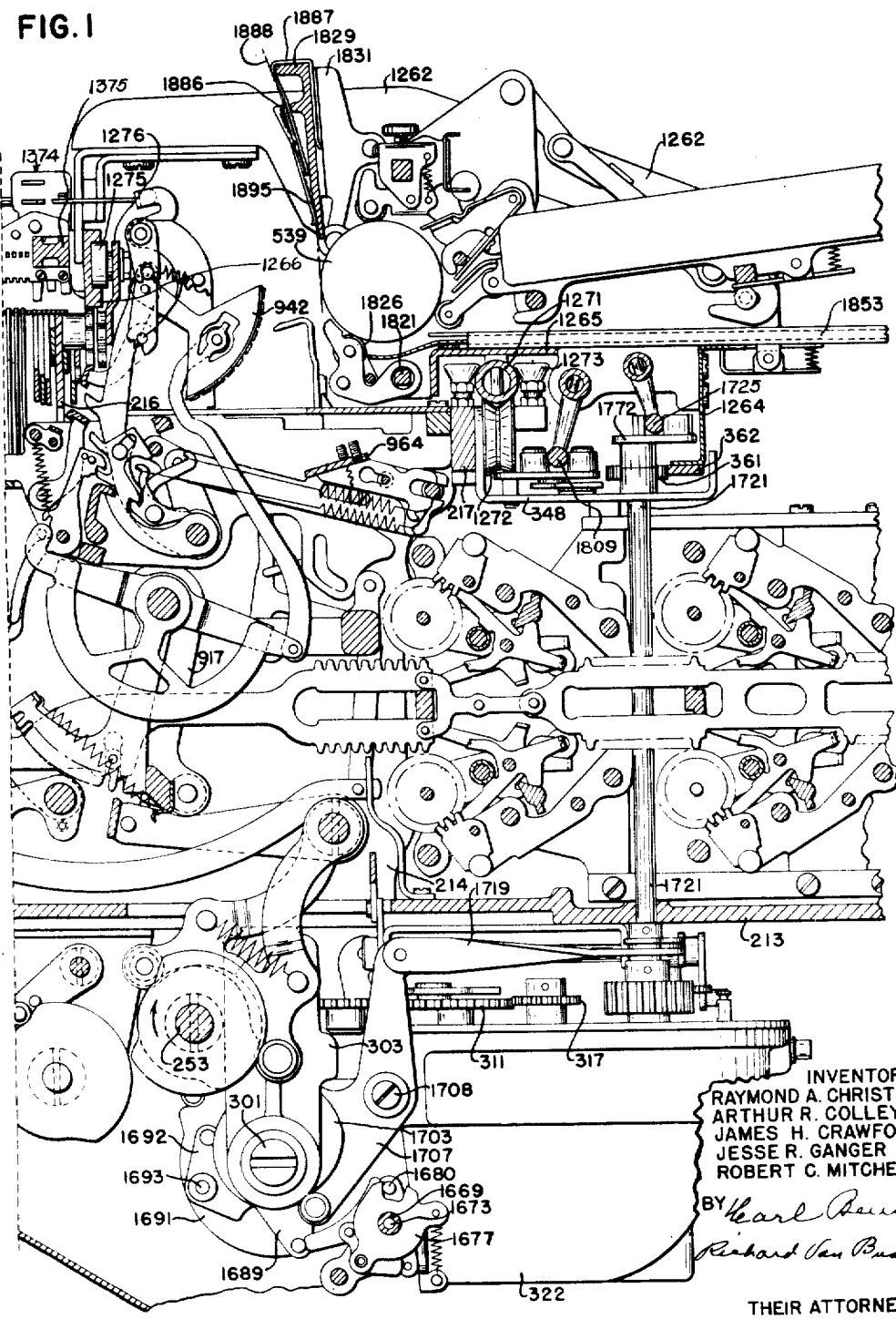

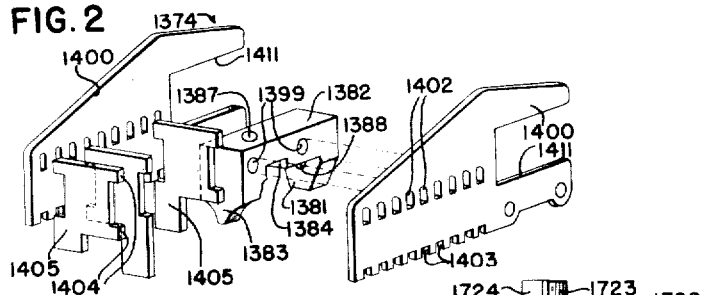
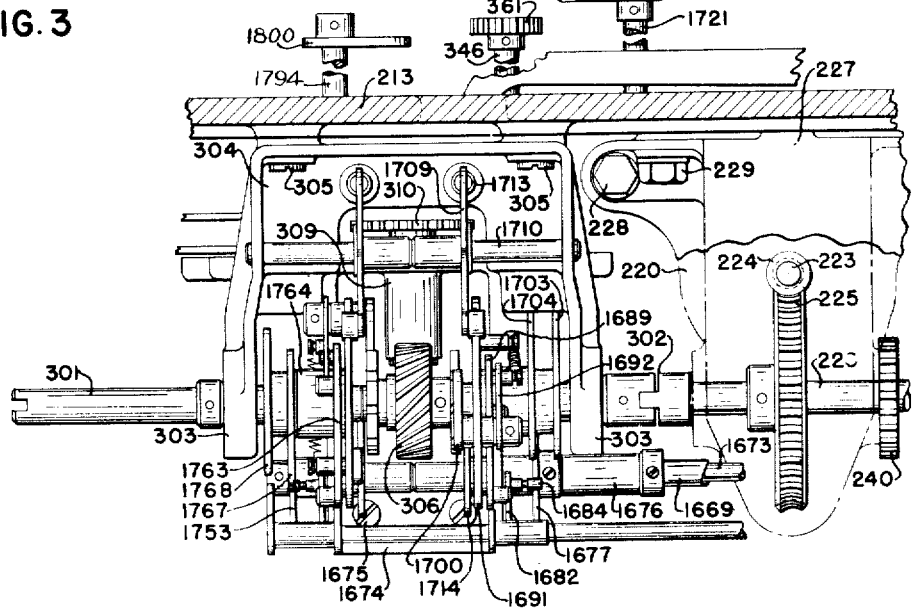
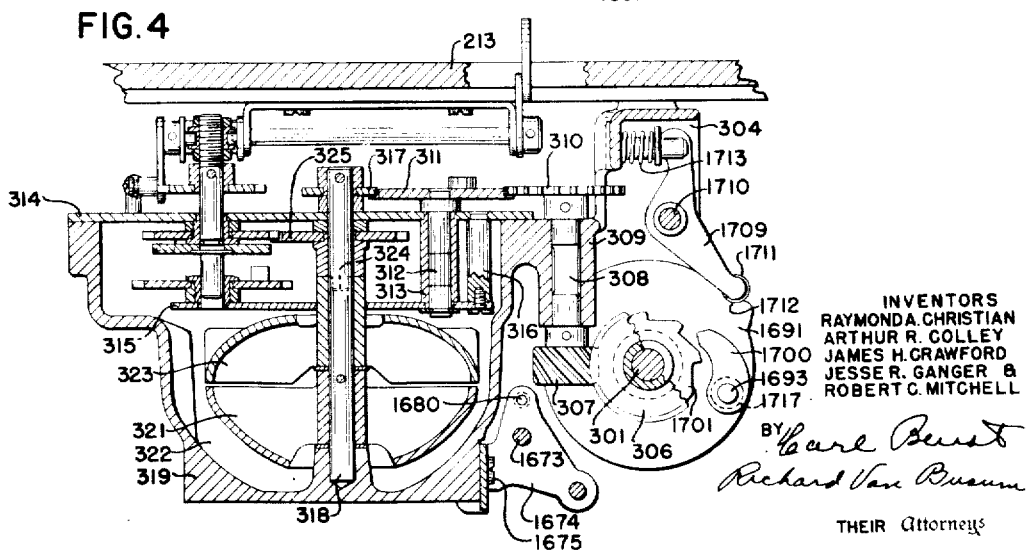

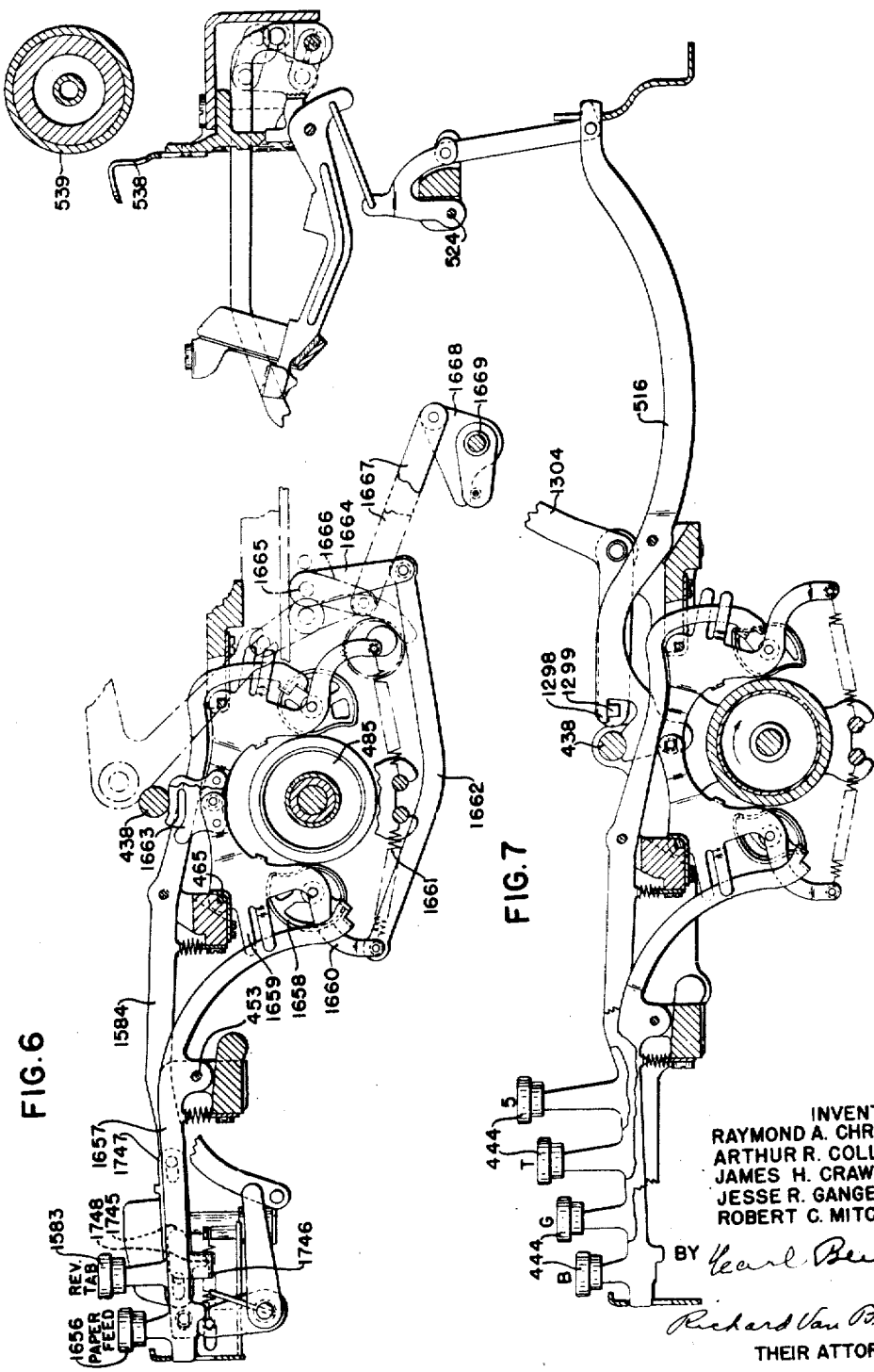

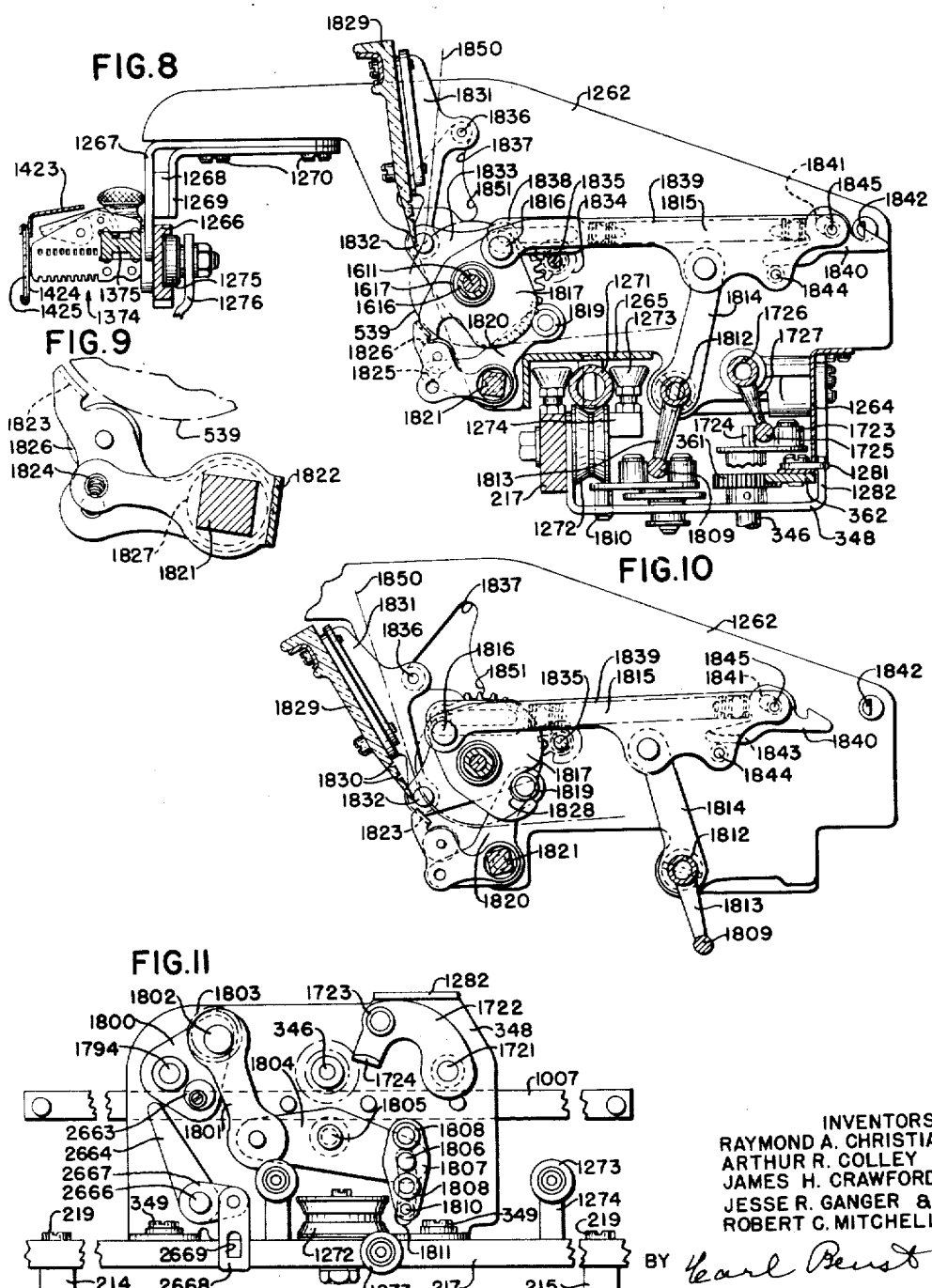

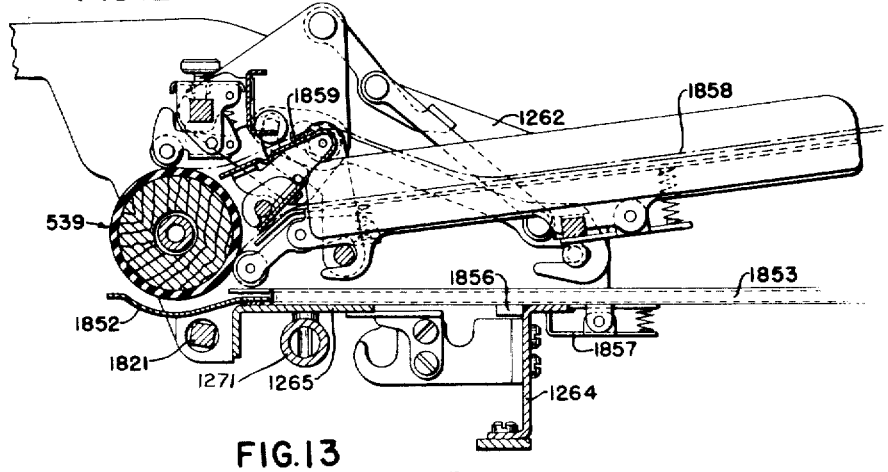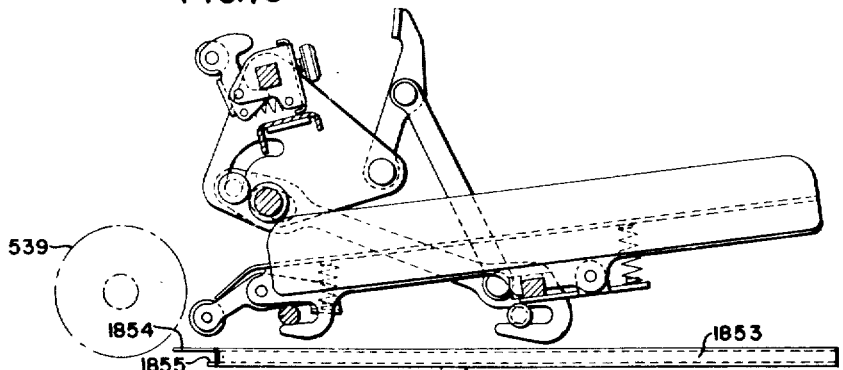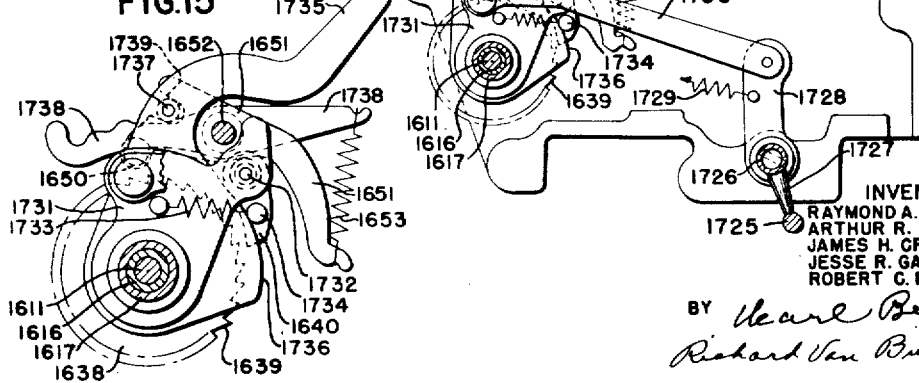

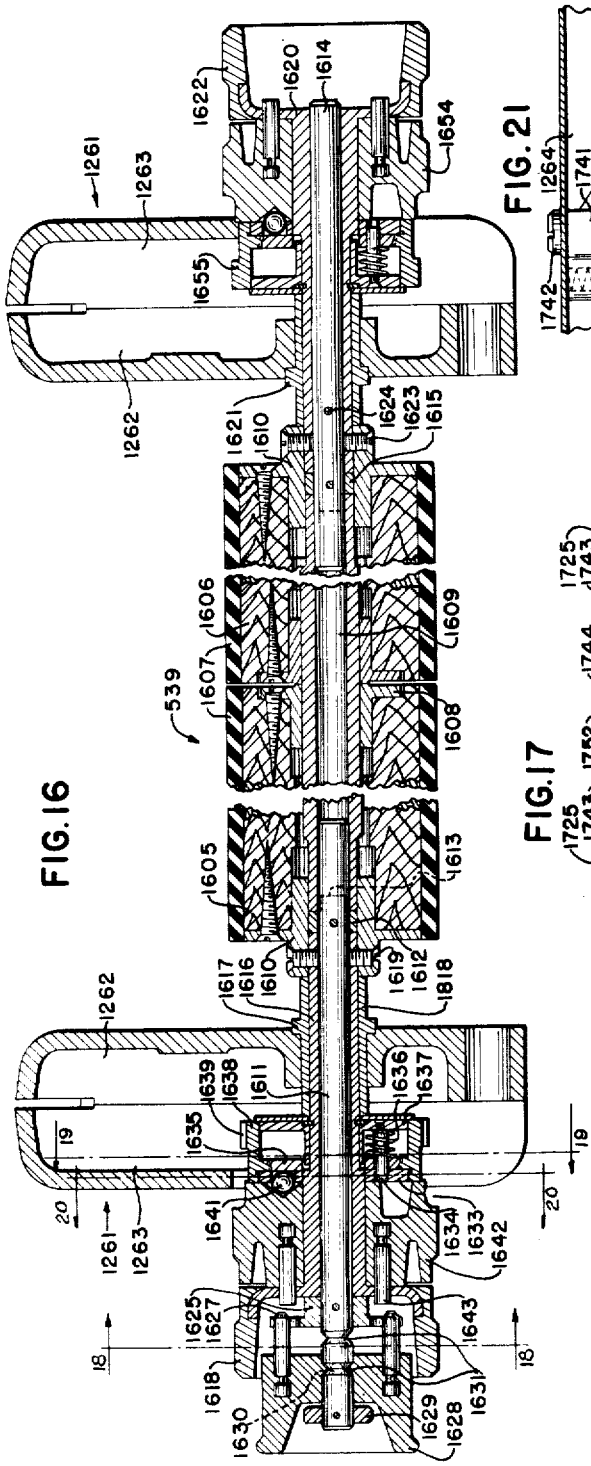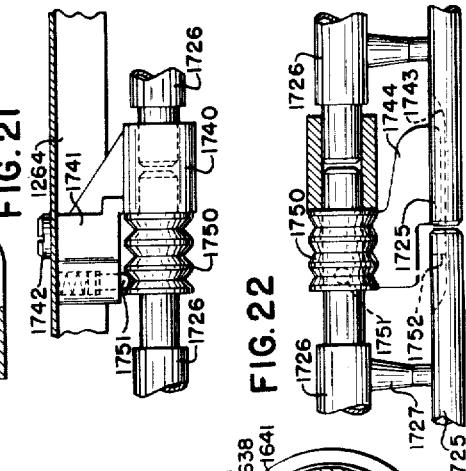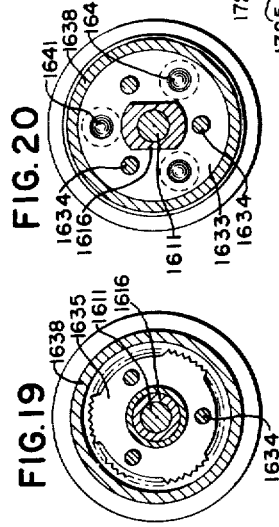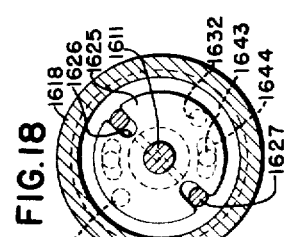

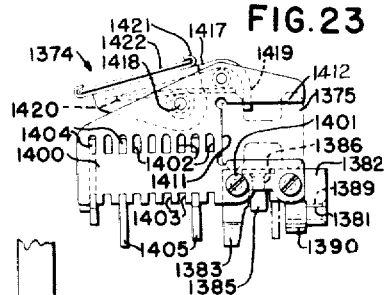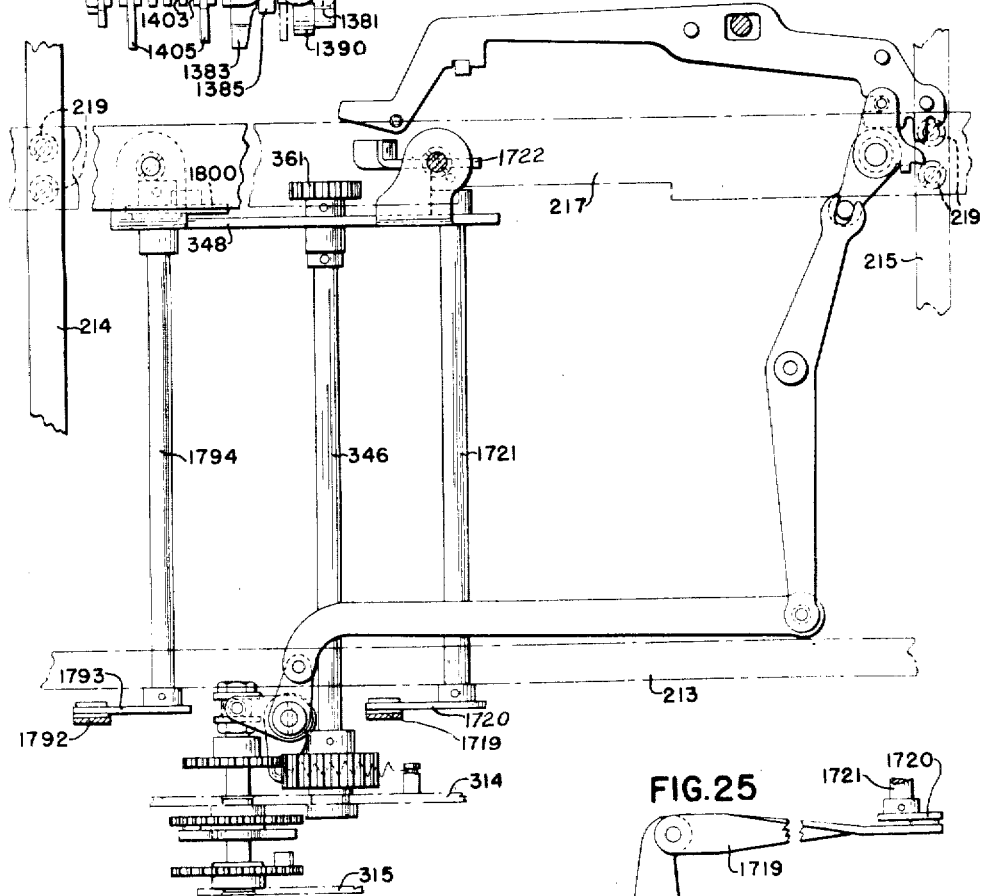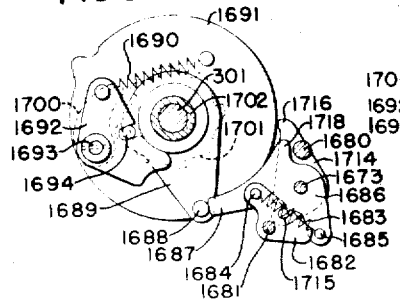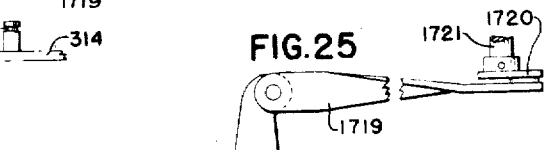
INVENTORS
RAYMOND A. CHRISTIAN
ARTHUR R. COLLEY
JAMES H. CRAWFORD
JESSE R. GANGER &
ROBERT C. MITCHELL
THEIR ATTORNEYS

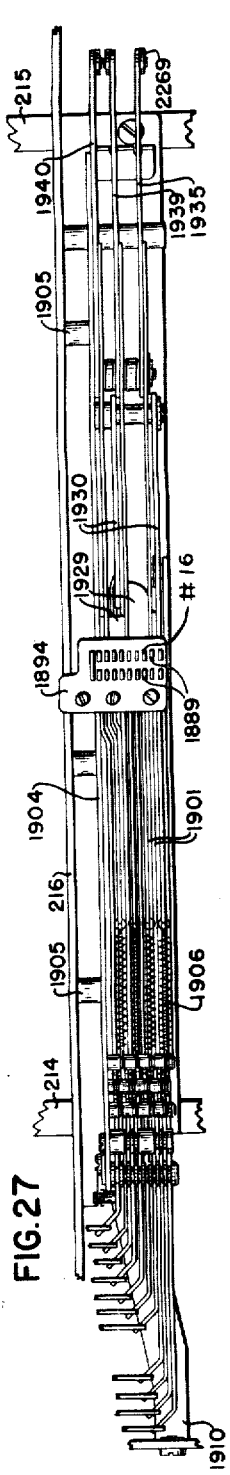

INVENTORS
RAYMOND A. CHRISTIAN
ARTHUR R. COLLEY
JAMES H. CRAWFORD
JESSE R. GANGER &
ROBERT C. MITCHELL

BY *Earl Beust*
*Richard Van Buren*

THEIR Attorneys

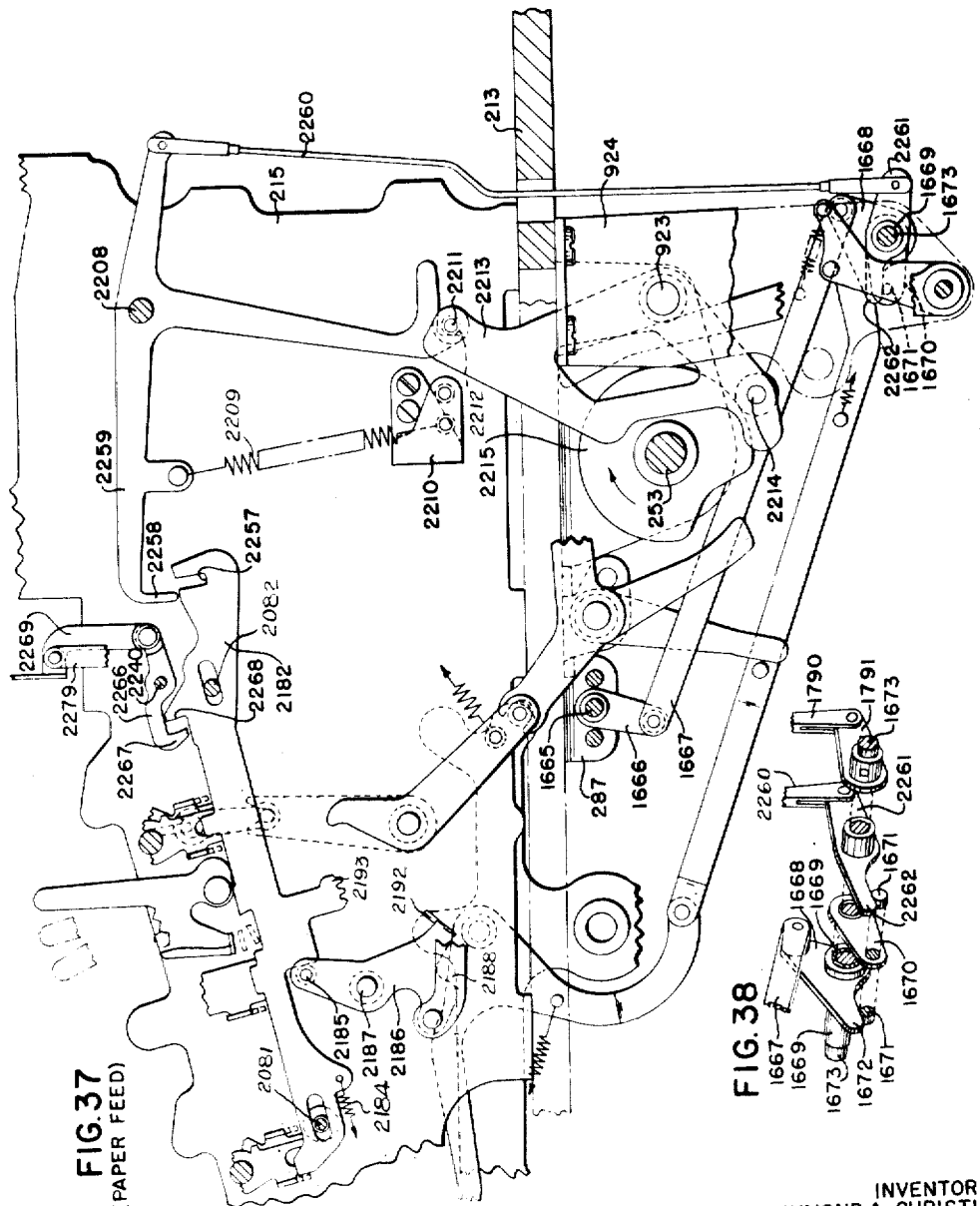

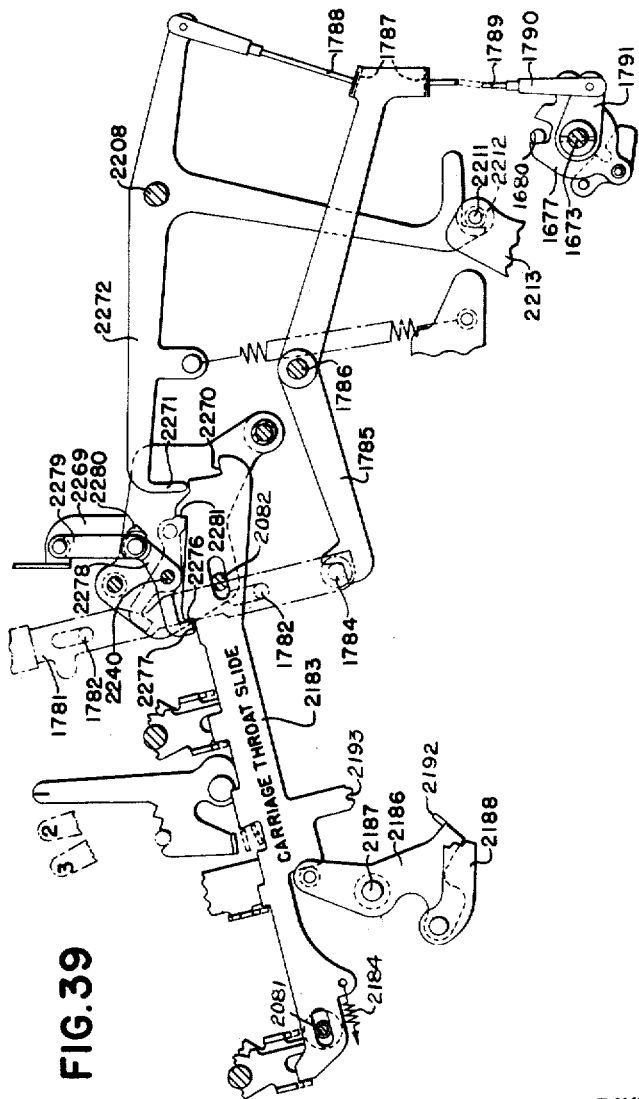

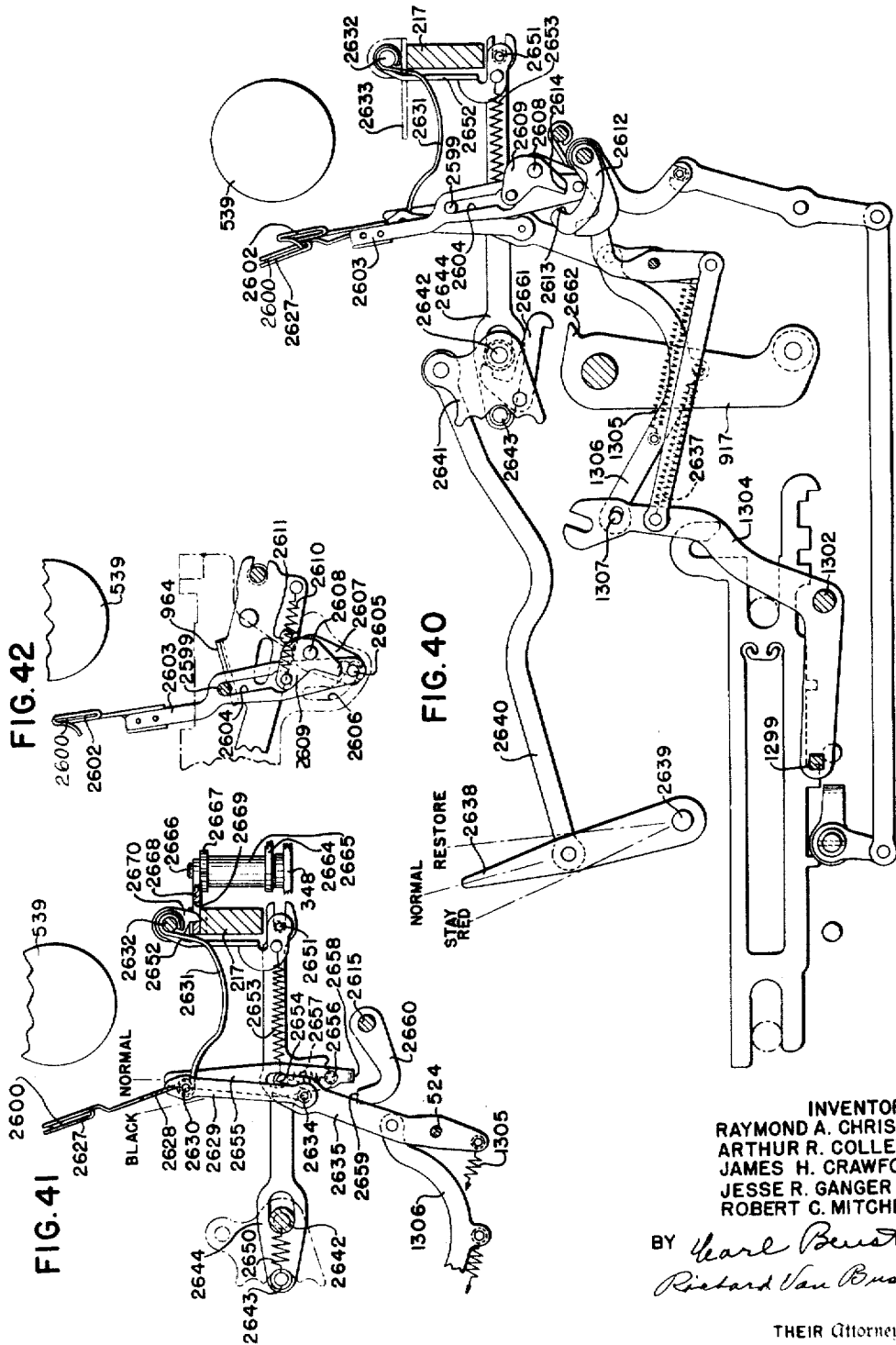

INVENTORS
RAYMOND A. CHRISTIAN
ARTHUR R. COLLEY
JAMES H. CRAWFORD
JESSE R. GANGER &
ROBERT C. MITCHELL
BY Carl Beust
Richard Van Buren
THEIR Attorneys

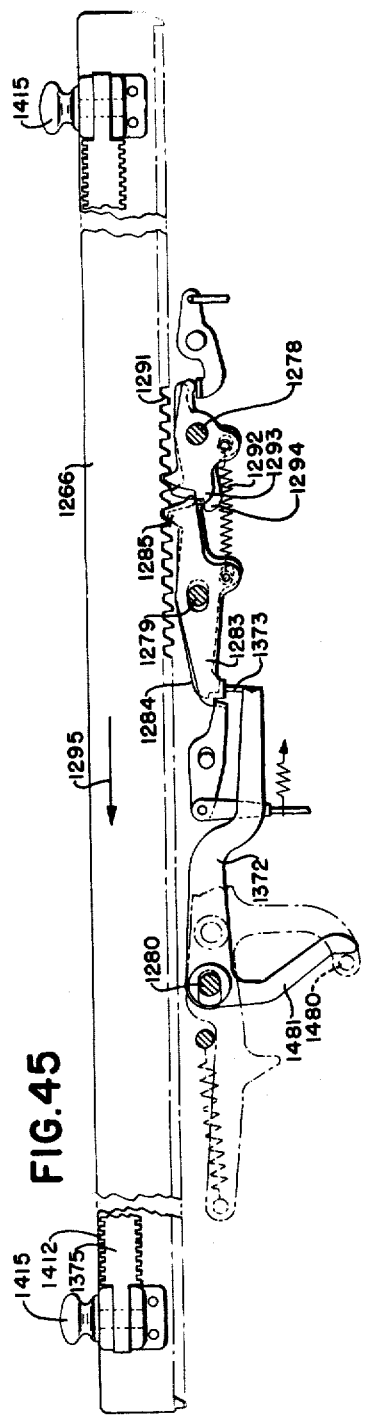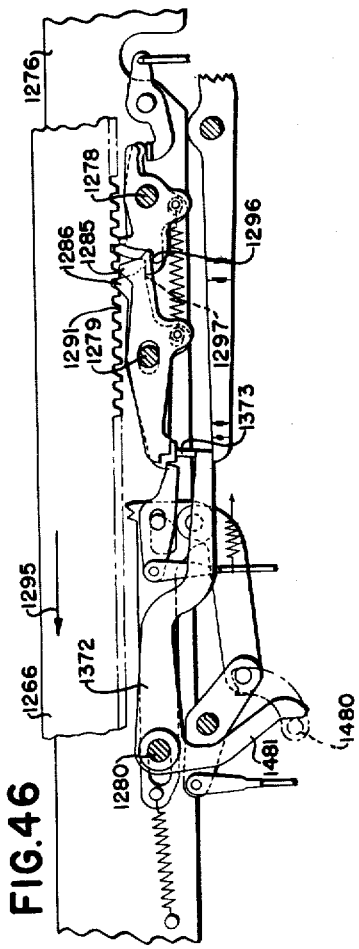

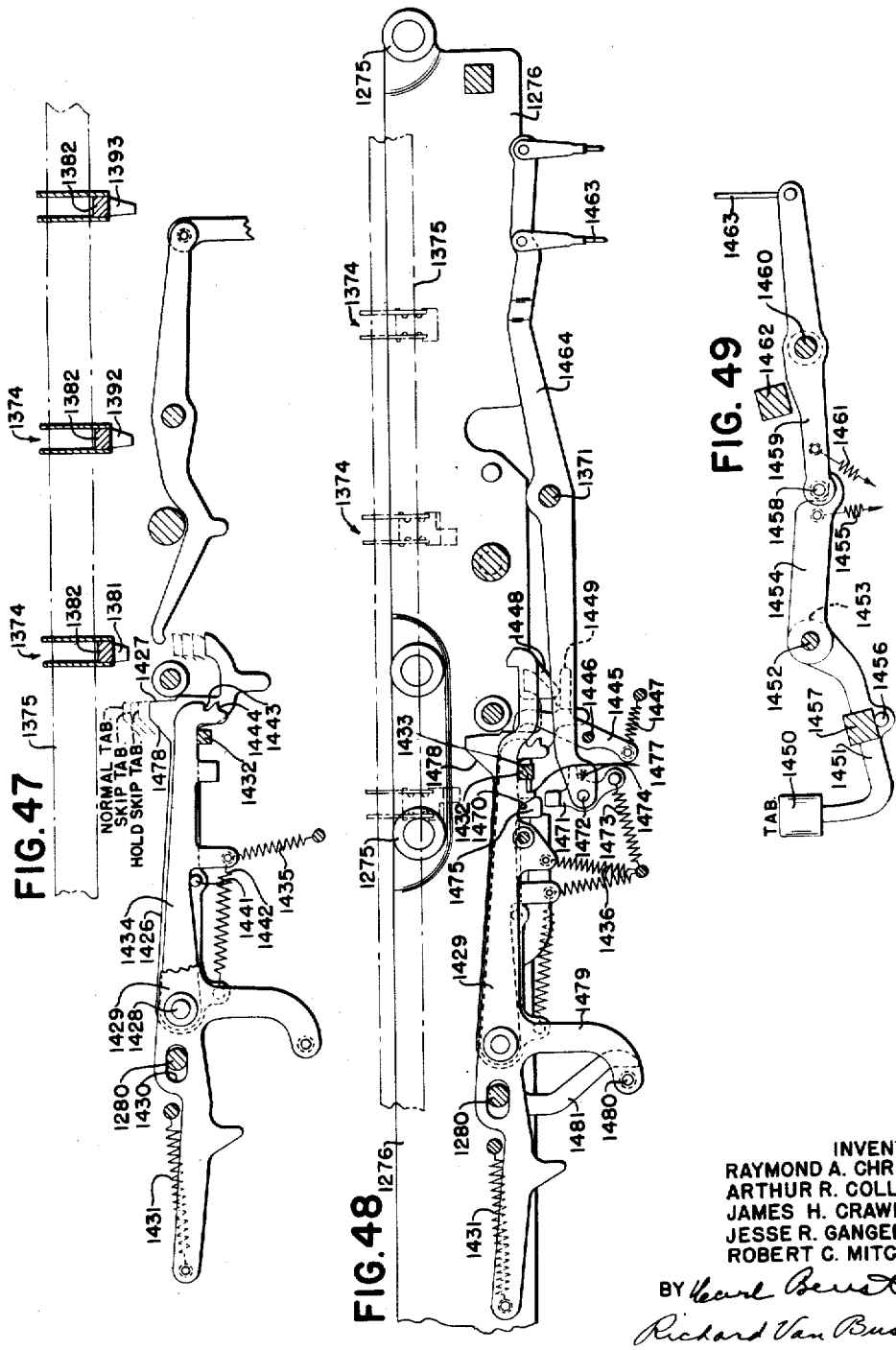

United States Patent Office 2,805,748
Patented Sept. 10, 1957

2,805,748

FRONT FEED CARRIAGES FOR ACCOUNTING MACHINES

Raymond A. Christian, Arthur R. Colley, James H. Crawford, Jesse R. Ganger, and Robert C. Mitchell, Dayton, Ohio, assignors to The National Cash Register Company, Dayton, Ohio, a corporation of Maryland Original application December 6, 1947, Serial No. 790,032. Divided and this application May 9, 1951, Serial No. 225,312

24 Claims. (Cl. 197—128)

The present invention relates to calculating machines and particularly to machines of the accounting or bookkeeping type which are provided with a traveling paper carriage for supporting the bookkeeping forms and also for automatically controlling the various functions of the machine in accordance with the columnar positioning thereof.

This application is a division of the co-pending application for United States Letters Patent filed on December 6, 1947, by Raymond A. Christian et al., Serial No. 790,032, now Patent No. 2,626,749, issued January 27, 1953.

In the business world of today, there are nearly as many different types of bookkeeping systems employed as there are separate business organizations. It has, therefore, been necessary for the builders of bookkeeping or accounting machines to frequently modify the designs of their machines in order to adapt them to the particular bookkeeping system employed by the prospective purchaser. These so-called "customer order" machines are costly to build, since certain portions of the machine must be practically hand-made in order to furnish a machine having the desired characteristics. Accordingly, it is an object of the present invention to provide a solution to this problem of adapting a particular type of accounting machine to fit the bookkeeping system utilized by any particular customer. This has been done in the present instance by designing an accounting or bookkeeping machine which is sufficiently flexible in character that it may be used in connection with practically any of the complex accounting systems used by present-day business establishments.

Another problem confronting both the manufacturers and the users of accounting machines is the complexity of many of our present bookkeeping systems. Not only is it difficult to construct machines which are capable of performing the many and complicated operations involved, but it is also difficult for the operator of the machine to learn how to manipulate the various controls of the machine so as to properly perform the various operations involved in making an entry on the books. It is, therefore, a further object of the invention to provide a bookkeeping machine which will perform most of these operations automatically and therefore require a minimum amount of time and attention on the part of the operator of the machine.

A further object of the invention resides in the provision of a simplified type of front-feed paper carriage. This carriage is driven in both its forward direction and its reverse direction by a hydraulic drive mechanism which is operated by the same motor which serves to drive the main operating mechanism of the machine.

Still a further object of the invention is to provide a traveling paper carriage having an improved type of front-feed mechanism.

A further object of the invention is to provide a paper carriage having a front-feed mechanism which is operable either under the control of certain manipulable elements on the keyboard or under the control of the paper carriage itself.

An additional object of the invention is to provide a traveling paper carriage having a split platen with a novel type of paper feed mechanism therefor.

With these and other objects in view which will become apparent from the following description, the invention includes certain novel features of design and combinations of parts, a preferred form or embodiment of which is hereinafter described with reference to the drawings which accompanying and form a part of this specification.

In the drawings:

Figure 1 is a longitudinal sectional view of the rearward portion of the machine taken just to the right of one of the amount banks.

Figure 2 is an exploded perspective view of one of the carriage stops used for controlling the various functions of the machine in accordance with the columnar position of the traveling paper carriage.

Figure 3 is a front view of a portion of the motor drive mechanism for the machine.

Figure 4 is a cross-section taken through the hydraulic coupling mechanism which drives the traveling paper carriage back and forth across the machine.

Figure 6 is a cross-sectional view of a portion of the electric typewriter mechanism as viewed from the right-hand side of the machine.

Figure 7 is a cross-sectional view of the typewriter structure showing the complete train of mechanism from the keys to the type levers.

Figure 8 is a cross-sectional view taken through the traveling paper carriage, showing in particular the front feed mechanism thereof. In this view, the mechanism is in its closed position.

Figure 9 is a detailed view of the forward compression rolls and the supporting and biasing means therefor.

Fig. 10 is a sectional view through the carriage showing the throat mechanism in its open position.

Figure 11 is a plan view of certain of the operating mechanism for the front feed and line-spacing mechanisms.

Figure 12 is a cross-sectional view taken through the traveling carriage, showing the journal sheet and ledger card guides, the upper and lower compression rolls, and the operating mechanism for the rolls.

Figure 13 is a view showing essentially the same structure as that shown in the preceding figure, but with the upper and lower compression rolls in their open or disengaged positions.

Figure 14 is a right-hand view of the paper feeding mechanism mounted on the travelling carriage.

Figure 15 is a detail view showing part of the mechanism illustrated in the preceding figure on a larger scale.

Figure 16 is a vertical section taken through the platen for the purpose of illustrating the split construction of this mechanism.

Figure 17 is a detail plan view of the split in the paper-feeding mechanism for the two-piece platen.

Figure 18 is a cross-section taken along the line 18—18 in Figure 16 and illustrates in detail the mechanism utilized for rendering the platen either split or "solid."

Figure 19 is a cross-section taken along the line 19—19 in Figure 16 and illustrates some of the details of the variable line-finding mechanism employed herein.

Figure 20 is a cross-section taken along the line

20—20 in Figure 16 and illustrates in further detail the variable line-finding mechanism.

Figure 21 is a plan view of a portion of the split in the feed mechanism.

Figure 22 is a front view of the mechanism shown in the preceding figure.

Figure 23 is a detail view of one of the carriage stops which is used to control the various functions of the machine.

Figure 24 is a front view showing the operative connections between the reverse tabulation mechanism and the reversing means for the hydraulic drive mechanism.

Figure 25 is a right side elevation of the paper feed clutch mechanism.

Figure 26 is a view showing the paper feed clutch mechanism with certain of the parts removed in order to more clearly illustrate the construction of the same.

Figure 27 is a plan view showing the sensing levers which cooperate with the carriage stops for the purpose of controlling the various machine functions.

Figure 28 is a front elevation of the mechanism shown in the preceding figure.

Figure 29 is a view showing a portion of the mechanism illustrated in the preceding figure.

Figure 30 is a view showing a portion of the mechanism illustrated in Figure 28.

Figure 31 is a view of the front feed clutch as it appears from the right-hand side of the machine.

Figure 32 is a detailed view showing additional elements of the front feed clutch mechanism.

Figure 33 is a left side view of certain parts of the stop sensing mechanism.

Figure 34:
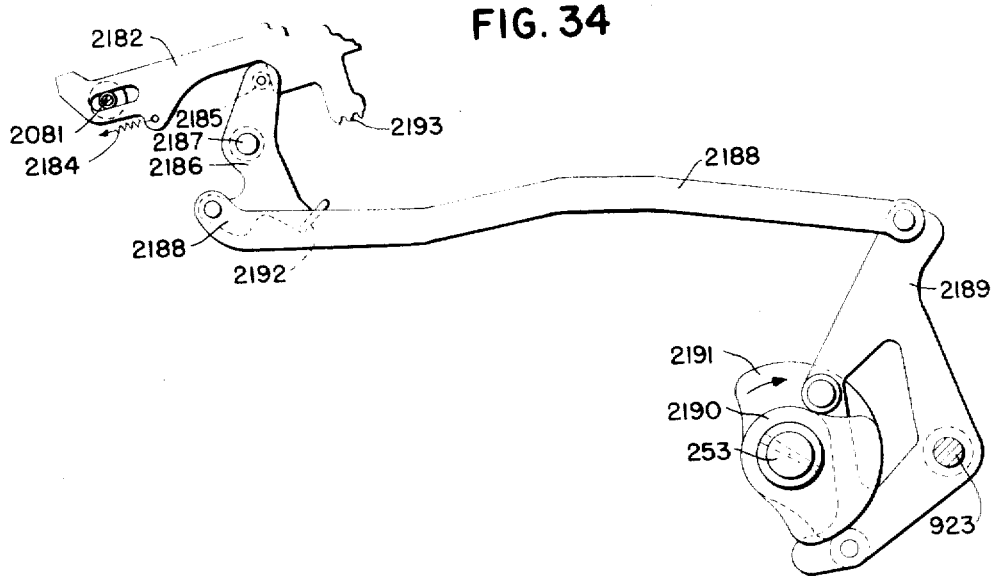

Figure 34 is a view illustrating in detail the slide operating mechanism.

Figure 35A:
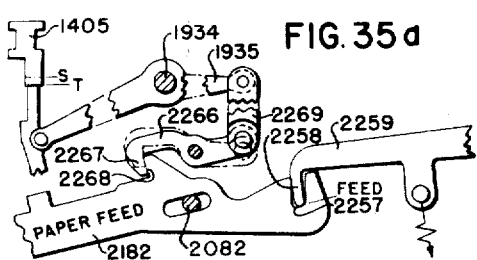
Figure 35B:
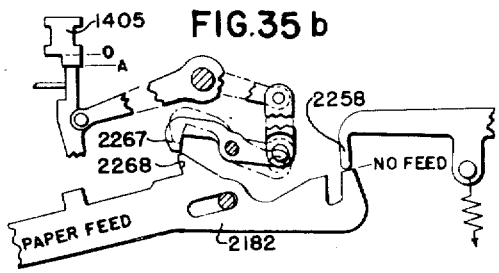

Figures 35a and 35b are diagrammatic views showing the control by the traveling paper carriage over the paper feed slide.

Figure 36:
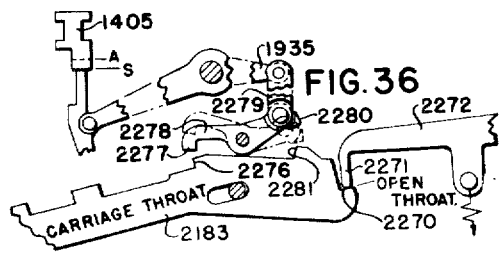

Figure 36 is a diagrammatic view illustrating the control by the carriage over the carriage throat slide.

Figure 37 is a right side view showing the means by which the traveling paper carriage controls the paper-feeding mechanism of the machine.

Figure 38 is a perspective view showing in detail certain of the structure illustrated in the preceding figure.

Figure 39 is a view showing the means whereby the traveling paper carriage controls the carriage throat mechanism of the machine.

Figure 40 is a right side view showing the various constructional features of the adding machine ribbon mechanism and the control thereover by means of a manually-settable lever and also by the totalizer control slides.

Figure 41 is a view showing the constructional details of the typewriter ribbon mechanism and the manipulatable lever for controlling the operation of this mechanism.

Figure 42 is a fragmentary view showing certain details of the adding machine ribbon mechanism shown in Figure 40.

Figure 43:
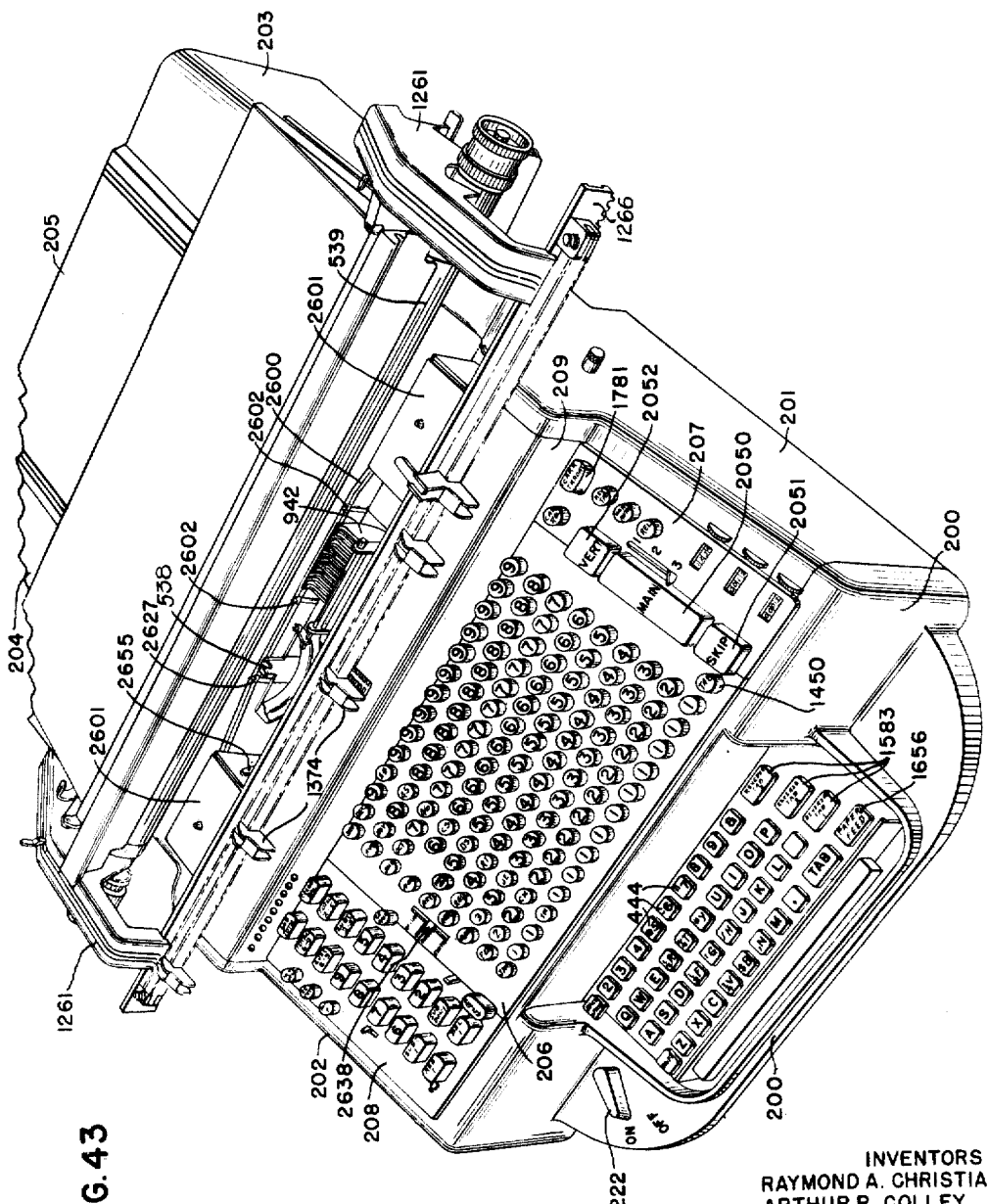

Figure 43 is a perspective view of the complete machine.

Figure 44:
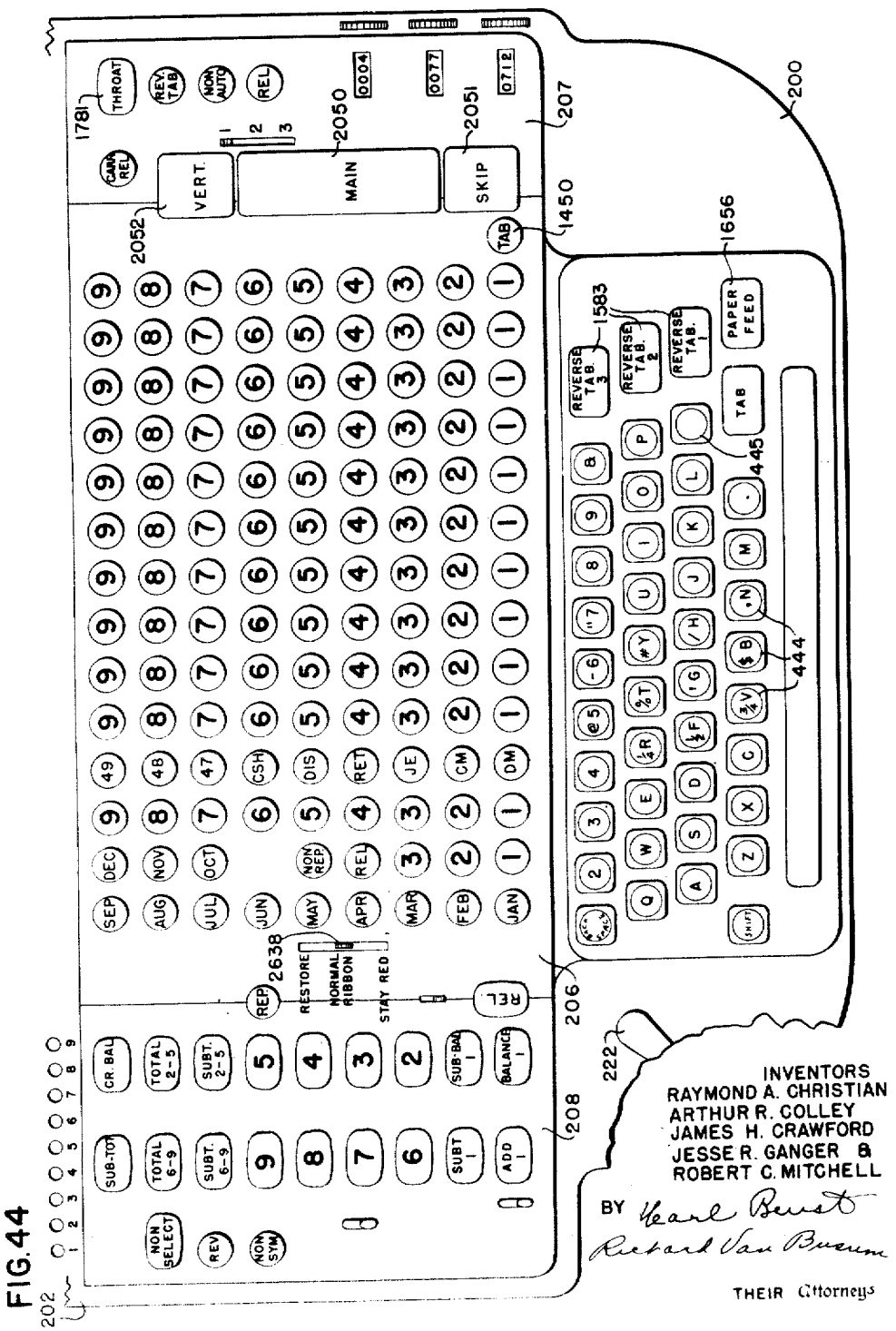

Figure 44 is a plan view of the adding machine and typewriter keyboards of the machine shown and described herein.

Figures 45 and 46 are front detail views showing in particular the carriage escapement mechanism.

Figures 47 and 48 are front detail views showing in particular the forward tabulating mechanism for the carriage.

Figure 49 is a detail side view of the adding machine "Tab" key and a part of the mechanism associated therewith.

Figure 50:
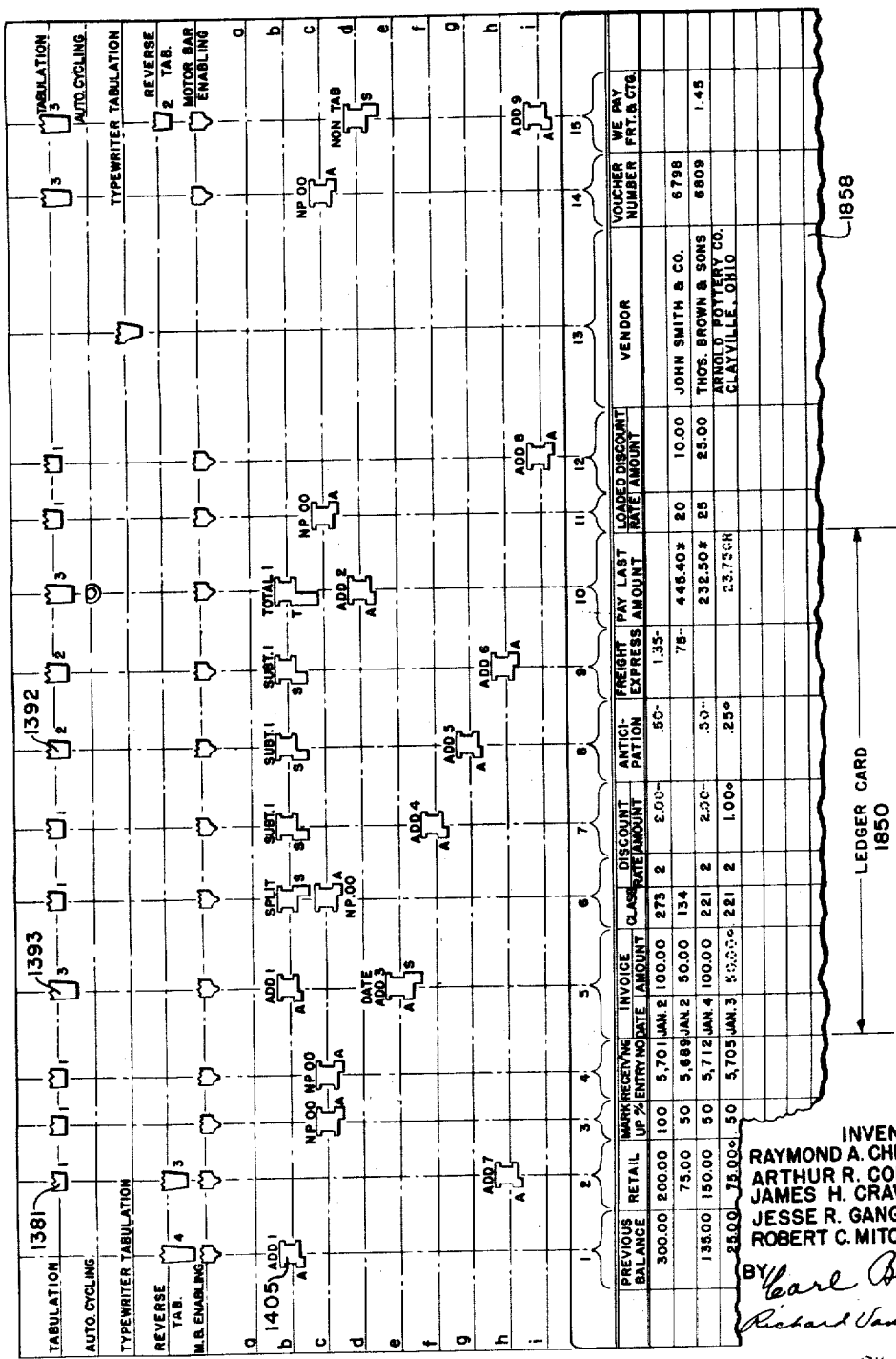

Figure 50 is a composite view of a facsimile of journal sheet upon which various numerical and typewritten entries have been made by a machine of the type disclosed herein, and also showing schematically the arrangement of the carriage stops in each of the various columnar positions.

*General description*

Certain of the principles and features of the machine hereinafter to be described are disclosed in the following United States patents:

1,197,276, September 5, 1916, Halcolm Ellis
1,203,863, November 7, 1916, Halcolm Ellis
1,819,084, August 18, 1931, Emil John Ens
2,038,717, April 28, 1936, Raymond A. Christian
2,079,355, May 4, 1937, Charles L. Lee
2,181,975, December 5, 1939, Charles L. Lee
2,189,851, February 13, 1940, Paul H. Williams et al.
2,217,221, October 8, 1940, Jesse R. Ganger
2,243,806, May 27, 1941, Laurence N. Lehman
2,316,520, April 13, 1943, Henry F. Lang Reference is also made to application Serial No. 524,846, filed March 3, 1944, now United States Patent No. 2,442,402 issued June 1, 1948, to John T. Davidson et al., and entitled "Forward and Reverse Tabulating Mechanism For Accounting Machines," for a further disclosure of certain of the features incorporated in the machine hereinafter to be described.

The basic structure of the present machine is patterned after the machine shown in the foregoing patents, which has been on the market for many years. For example, the construction and arrangement of the keyboard, the differential actuators, the printer, and the totalizers are practically identical with the corresponding mechanisms shown in the patents. The basic structure of the prior art machine is disclosed in the Ellis Patent No. 1,197,276, while an add-subtract totalizer of the same general type as that used in the present machine is disclosed in Ellis Patent No. 1,203,863. The totalizer engaging and disengaging mechanism, on the other hand, is shown in the above-mentioned Patent No. 2,442,402. Most of the mechanisms for controlling the various machine functions, however, are new in the subject machine, as are also the paper carriage and the controlling mechanisms therefor. In addition, the instant machine is equipped with an electric typewriter which is driven by the same motor that operates the remainder of the machine. With this brief, overall description in mind, the various parts of the machine will now be described in detail, so as to provide a full and complete understanding of the entire device.

*General organization and cabinet*

A prespective view of the machine as a whole is shown in Figure 43 of the drawings, and a general understanding of the layout and organization of the machine may be obtained from this illustration. As shown herein, a typewriter keyboard is located at the front end of the machine, while just behind and somewhat above this keyboard is an amount keyboard on which may be set up the various amounts which are to be entered in the accounting machine. To the left of the amount keyboard is a control keyboard containing the various function control keys, while to the right of it are located a plurality of motor bars and carriage control keys. In the center, just above the amount keyboard, are a group of type sectors for the accounting machine, while just to the left of these sectors is located a type basket for the electric typewriter. Immediately behind the aforementioned printing mechanism is a rotatable platen on which accounting forms and/or other record material may be supported, this platen being mounted on a traveling carriage which is movable back and forth across the machine. Behind the paper carriage is shown that part of the machine cabinet which houses the add-subtract totalizers. At the front of the machine, just to the left of the typewriter keyboard, is a switch lever for starting and stopping a continuously running electric motor, which drives the various operating mechanisms of the machine.

As shown in Figure 43, the operating mechanism of the machine is housed in a cabinet made up of several separate sections, each of which is independently removable in order to yield access to the part of the machine lying thereunder. This cabinet is composed of a front piece 200, extending across the front of the machine and having a central opening therein for accommodating the keys of the typewriter mechanism. Located on either side of the machine are side plates 201 and 202, immediately behind which are located additional side plates 203 and 204, which cover the sides and part of the top of the totalizer section of the machine. The top of the totalizer section is further covered by a plate 205, which also extends down over the rear end thereof and, together with similar downwardly-extending portions on side pieces 203 and 204, serves to cover the rear of the machine.

The thus-constituted accounting machine cabinet is further complemented by keyboard cover plate 206, 207, and 208, which are provided with apertures through which extend the upper ends of barrel-type key caps. To the rear of the keyboard and extending across the machine between the side pieces 201 and 202 is an angular strip of metal 209, which encloses a carriage control mechanism which will be described in detail in a subsequent portion of this description.

*Framework*

The principal element of the machine frame is a cast iron base 213 (Fig. 1) which supports, either directly or indirectly, all of the various mechanisms going to make up the present machine. This base is generally rectangular in shape and is provided with various ribs, pads, bosses, and cut-outs for accommodating all of the various structures supported thereon or depending therefrom. Mounted on top of the base toward the front of the machine are a left side frame 214 and a right side frame 215 (see Figures 1, 24 and 27). Extending between the upper portion of the side frames and connected thereto is an angle bar 216, which serves to support the forward part of the carriage as well as the carriage control mechanisms cooperating therewith. Located behind the angle bar 216 and supported by the side frames is a rail 217 for supporting the rearward portion of the carriage. The angle bar 216 is secured to the side frames 214 and 215 by screws 218, as shown in Figure 28, while the rail 217 is secured to the side frames by screws 219, as shown in Figures 11 and 24. The base, the side frames, and the cross pieces for supporting the carriage constitute the main framework of the machine, although there are, of course, numerous sub-frames secured in one way or another to these main frame elements for supporting the various operating mechanisms of the machine. These sub-frames will be described in connection with the mechanisms which they support as the description proceeds.

*Motor drive*

Figure 5:
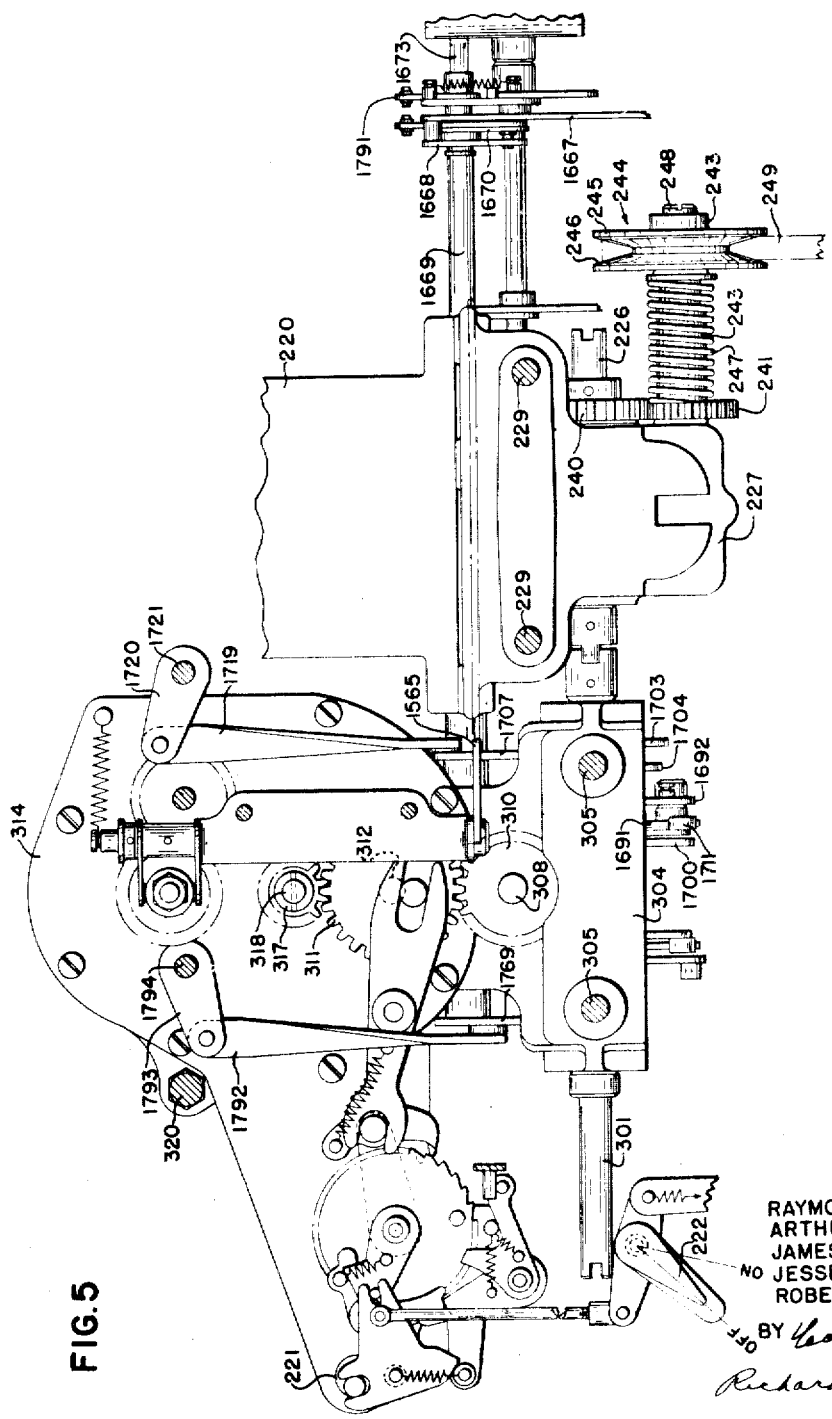
Fig. 5 is a plan view of the motor drive mechanism, the hydraulic coupling device, and the time delay switch for turning off the motor after the machine has stood idle for a predetermined length of time.

The various operating mechanisms of the present machine are driven by an electric motor 220 (Figs. 3 and 5) secured to the under side of the base 213. As previously mentioned herein, the motor is adapted to operate continuously while the machine is in use and may be turned on or off by means of a single-pole, single-throw toggle switch 221 (Fig. 5), which may be operated from the front of the machine by means of a lever 222 (Figures 43 and 44) operably connected therewith. A speed control device or governor (not shown) is provided on the rear end of the motor shaft for the purpose of maintaining the speed of the motor essentially constant under the varying load encountered in this type of service. On the front end of the motor shaft 223 (Figure 3) is secured a worm 224, which meshes with a worm wheel 225 pinned to a shaft 226, which is journaled at either end on bearings (not shown) provided in the side walls of a gear casing 227, which is secured by bolts 228 (only one shown) to the frame of the motor 220 and by other bolts 229 (only one shown in Figure 3) to the under side of the base 213. Hence, whenever the motor is running, the shaft 226 will be driven at a reduced rate of speed through the worm 224 and the worm wheel 225. Pinned to the right end of the shaft 226 is a spur gear 240 (Figures 3 and 5), which meshes with another spur gear 241 (Figure 5). The gear 241 is secured to a sleeve 243, which is rotatably journaled on a long stud mounted in the right-hand side of the gear casing 227. Secured near the right-hand end of the sleeve 243 is a V-belt pulley indicated generally at 244 and consisting of a right-hand flange 245, which is rigidly secured to the sleeve 243, and a left-hand flange 246, which is constrained to rotate with the sleeve but is free for limited longitudinal movement thereon. A compression spring 247 surrounds the sleeve 243 and bears against the gear 241 on one end and the left-hand flange 246 on the other end so as to constantly tend to move the left-hand flange to its rightmost position, thus tending to take up any play in a V-belt 249, which passes around the pulley 244 and serves to operate the power-driven roller of the electric typewriter, in the usual manner. The sleeve 243 and the parts assembled thereon are retained on the long stud by means of a cap screw 248, which screws into a tapped hole in the end of the stud.

The gear 240 meshes with a gear (not shown) which is connected to the driving member of a clutch mechanism free on a main cam shaft 253 which extends across the machine beneath the base 213 (Figure 1) and is journaled in brackets (not shown) secured to the lower face of said base. The clutch driving member is arranged to be coupled to a clutch driven member (not shown) secured to the shaft 253 for giving said shaft cycles of operation which normally consist of one clockwise revolution, as viewed in Figure 1, for each machine operation. At the end of a cycle of operation the clutch mechanism is automatically disengaged to terminate machine operation.

The clutch mechanism is engaged to initiate machine operation under control of depressible motor bars 2050, 2051 and 2052 (Figures 43 and 44) and under control of the traveling carriage in predetermined columnar positions thereof.

*Hydraulic drive mechanism*

Referring now to Figures 3 and 4 of the drawings, a shaft 301 is coupled at 302 to the shaft 226 driven by the motor 220 and consequently revolves in unison with said shaft 226. The shaft 301 is journaled in a pair of downwardly-extending legs 303 of a casting 304 secured to the under side of the base 213 by screws 305. Located on the shaft 301 approximately midway between the legs 303 is a helical gear 306, which meshes with another helical gear 307 pinned to the lower end of a vertical shaft 308 journaled in a boss 309 formed integrally with the casting 304. Secured to the upper end of the shaft 308 is a spur gear 310, which meshes with a somewhat larger gear 311 secured to the upper end of a stub shaft 312. The shaft 312 is journaled in a bushing 313 extending between a cover plate 314 for the hydraulic drive mechanism and an auxiliary plate 315 suspended from the cover plate 314 by means of hanger studs 316 (only one shown). Meshing with the gear 311 is a small gear 317, which is pinned to the upper end of a vertical shaft 318. The shaft 318 is journaled at its upper end in the plate 314 and at its lower end in a hole formed in the bottom of a bowl-shaped casing 319, which is cast integrally with the casting 304. Further support for the casting 319 is provided by a suspension stud 320 (Figure 5) attached to the base 213.

As shown in Figure 4, the lower end of the shaft 318 is pinned to an impeller 321, which is completely submerged in a body of oil 322 contained in the casting 319. Located directly above the impeller 321 and also completely submerged in the oil 322 is a runner 323, which is freely rotatable on the shaft 318. The runner 323 is coupled by means of clutch nuts 324 to the hub of a gear 325 rotatably mounted on the shaft 318 so as to cause the gear to rotate in unison with the runner. The gear 325 drives a reversible mechanism which is operatively connected to a vertical shaft 346 (Figure 24) journaled at opposite ends in the plate 314 and in a bracket 348 secured to the rail 217. Fast on the upper end of the shaft 346 is a gear 361 which meshes with a rack 362 (Figures 1 and 8) secured to the traveling carriage. The above-described mechanism provides a means of transmitting the power of the hydraulic drive mechanism to the traveling carriage to yieldingly drive said carriage in either a forward or a reverse tabulating direction, whichever is required.

Traveling paper carriage

As shown in Figures 8 and 16, the traveling paper carriage consists of a framework which includes a pair of end housings indicated generally at 1261, each housing being formed of an inner casting 1262 and an outer casting 1263. The housings 1261 are supported in their spaced positions by means of a Z-bar 1264 (Figure 8), an L-bar 1265, and an I-bar 1266, to which the inner and outer castings are secured by means of screws or other suitable fastening means.

The Z-bar and the L-bar are secured directly to the end housings, whereas the I-bar 1266 is secured at either end to a bracket 1267, which is bonded to a block of rubber 1268, which is in turn bonded to a second bracket 1269 secured by screws 1270 to the end housing. Freedom of movement between the bracket 1267 and the bracket 1269 is provided by means of transversely elongated holes formed in the bracket 1267, within which are located spacing collars (not shown), which are made of slightly thicker material than the bracket 1267 and on which the bracket 1269 is securely clamped by means of the screws 1270. The I-bar is thus free to move against the resilience of the rubber block 1268 in a direction along the length of the rail but is prevented from moving relatively to the carriage frame in a vertical direction.

The thus-constituted carriage frame is supported for transverse sliding movement on the accounting machine frame by means of a tube 1271 secured to the under side of the L-bar 1265, which tube cooperates with a series of grooved rollers 1272, which are rotatably secured to the rail 217. The tube 1271 also cooperates with a series of conical rolls 1273 located on either side of the tube, those located on the forward side of the tube being mounted on the rail 217 and those located to the rear of the tube being mounted on posts 1274 (see also Figure 11) secured to the rear side of the rail 217. The forward portion of the carriage is supported on rolls 1275, which are received within a groove formed in the I-bar 1266. As shown in Figure 1, the rolls 1275 are rotatably mounted on a vertical frame plate 1276, which is secured to the vertical portion of the angle bar 216 by means of mounting posts and studs.

The carriage is yieldably driven in either direction across the machine by means of the gear 361 (see Figures 1, 3 and 8), which meshes with the rack 362, secured by screws or other fastening means to the Z-bar 1264. Also secured to the rack are a pair of limit stops 1281 (only one shown), which are secured thereto near either end thereof and cooperate with an upturned ear 1282 (see also Figure 11) formed on the bracket 348 so as to limit the lateral travel of the carriage and prevent it from moving off the ends of the guide rails.

The gear 361 is arranged to be rotated in either direction by means of the hydraulic drive mechanism (Figure 4) driven by the electric operating motor 220. Hence, whenever the motor is operating, the carriage will be resiliently urged to move in either a left-hand direction or a right-hand direction across the machine.

Carriage escapement mechanism

Inasmuch as the present machine is intended to function both as a typewriter and also as an accounting machine, it is necessary that means be provided for enabling the traveling paper carriage to be letter-spaced in a left-hand direction (hereinafter also referred to as the "forward" direction) under the control of the electric typewriter and to also be tabulated from column to column under control of both the typewriter and accounting machine mechanisms.

The letter-spacing movement of the carriage is controlled by the escapement mechanism composed of a pair of escapement pawls 1283 and 1284 (see Figures 45 and 46) provided with teeth 1285 and 1286, respectively, which are adapted to engage with rack teeth 1291 provided along the lower edge of the I-bar 1266. The escapement pawls are pivotally supported on the frame stud 1279 and are resiliently urged toward the right, as viewed in Figures 45 and 46, and also counter-clockwise about the stud by means of springs 1292 (only one shown), which are stretched between the pawls 1283 and 1284 and a pair of rebound pawls 1293 and 1294, which are pivotally mounted on the frame stud 1278. The holes in the escapement pawls for accommodating the stud 1279 are slightly elongated so as to permit the pawls to be moved through a distance equal to approximately one-half of the letter space in a direction corresponding to the length of the I-bar 1266.

The teeth 1285 and 1286 of the escapement pawls are adapted to be alternately engaged with the teeth 1291 to thereby permit step-by-step letter-spacing movement of the traveling carriage. As shown in Figure 45, the tooth 1285 of the front pawl 1283 is in engagement with one of the rack teeth 1291, and the pawl is in its leftmost position on the stud 1279, the pawl having been moved to this position against the urgency of its spring 1292 by means of the hydraulic drive mechanism for the carriage. This mechanism normally urges the carriage to move in its forward direction or in the direction of the arrow 1295 with sufficient force to overcome the force of the spring 1292. At this time, the escapement pawl 1284 will be pulled toward the right by the spring 1292 and will be located with its tooth 1286 resting on top of one of the teeth 1291. When the pawl 1283 is disengaged from the rack teeth 1291 in a manner to be described hereinafter, the tooth 1286 on the pawl 1284 will engage with the rack teeth and will thereby be forced toward the left against the urgency of its spring 1292. As a result, the traveling carriage will be permitted to escape one letter space toward the left or in the forward direction. The pawl 1283 will, when disengaged from the rack teeth, be moved toward the right by its spring 1292 so as to occupy a position like that shown in Figure 46, where its tooth 1285 rests on top of one of the rack teeth 1291. In order to move the paper carriage one more letter space in the forward direction, the pawl 1284 must be disengaged from the rack teeth so as to permit the carriage to escape until the tooth 1285 is engaged against one of the rack teeth and the elongated hole therein is engaged against the right-hand side of the stud 1279.

Rebound pawls 1293 and 1294 are provided for the purpose of preventing the carriage from rebounding when it is stopped by the engagement of one of the teeth 1285 or 1286 with the rack teeth 1291. The problem of carriage rebound is not so important in connection with the letter-spacing movement of the carriage, but it may become somewhat of a problem in the case of the tabulating movement of the carriage from one column to another when the machine is performing its accounting machine functions. The springs 1292 urge teeth on the rebound pawls (similar to the teeth 1285 and 1286) into engagement with the rack teeth 1291. The rebound pawls are provided with shoulders 1296 and 1297, which lie beneath the right-hand ends of their associated escapement pawls and are urged into engagement therewith by the springs 1292. As shown in Figures 45 and 46, the design of this mechanism is such that, whenever a tooth on one of the escapement pawls is engaged with the rack teeth, the tooth of its associated rebound pawl 1293 will likewise be engaged therewith. However, when one of the escapement pawls is moved out of engagement with the teeth 1291, the associated rebound pawls 1293 and 1294 will likewise be moved out of engagement therewith. Hence, whenever movement of the carriage is arrested by the engagement of an escapement pawl with the rack teeth, the tooth of the rebound pawl connected therewith will likewise engage with the rack teeth and thereby prevent any rebounding of the carriage. Also, whenever one of the escapement pawls is disengaged from the rack teeth, the rebound pawl associated therewith will likewise be carried out of engagement with the teeth so as not to interfere with the free movement of the carriage under control of the escapement pawls.

The escapement pawls 1283 and 1284 are controlled by the keys and the space bar of the electric typewriter to cause the traveling carriage to be letter-spaced toward the left. Also a back-space key and associated mechanism are provided for letter-spacing the traveling carriage in a reverse direction or toward the right. Likewise typewriter tabulating keys and associated mechanisms are provided for controlling the forward and reverse tabulating movement of the carriage to various pre-selected columnar positions. Inasmuch as these typewriter letter-spacing and tabulating control mechanims are of little import in connection with the present application, it is believed that the above general statement concerning them is sufficient.

*Carriage stops*

In order to control the tabulating movement of the traveling paper carriage back and forth across the machine and also to enable the carriage to control the various functions of the accounting machine, a series of carriage stops 1374 (Figs. 2 and 23) are removably secured to an I-shaped stop bar 1375 carried by the traveling carriage. The constructional details of the carriage stops are shown in Figures 2 and 23 of the drawings, it being noted that the each of the stops is provided with a stop block 1382, which is a machined block of metal having two downwardly-extending projections 1381 and 1383, the projection 1381 constituting a forward tabulation stop and the projection 1383 constituting a motor bar enabling lug. The block 1382 is provided on its underneath side with a transverse groove 1384 for receiving a reverse tabulation stop 1385 which is provided with a cylindrical tenon 1386, which is adapted to be received within a hole 1387 bored vertically through the block 1382 and riveted over at its upper end so as to fasten the stop 1385 securely to the block. As shown in Figure 2, the projection 1381 is provided with a horizontally-extending hole 1388, which is adapted to receive a pin 1389 (Figure 23) formed on the side of an automatic cycling lug 1390, the end of the pin being riveted over so as to securely fasten the lug to the block 1382. Figure 47, the forward tabulation stops are provided in three different lengths: a short or "normal-tab" stop 1381; an intermediate or "skip-tab" stop 1392; and a long or "hold-skip-tab" stop 1393. Similarly, the stops for controlling the tabulating movements of the carriage in the reverse direction are provided in four different lengths, and are known as the No. 2, No. 3, and No. 4 reverse tabulation stops.

Each stop block 1382 is provided with a pair of transverse holes 1399 (Figure 2) for enabling a pair of side plates 1400 to be secured thereto. The method of fastening the plates to the block may either take the form of rivets, where a permanent type of construction is desired, or screws 1401 (Figure 23) may be used where a temporary set-up is desired. Each of the side plates 1400 is provided with apertures 1402 and notches 1403, which are adapted to receive lugs 1404 formed on the sides of function control plates 1405, the purpose of which will be described in greater detail later on herein.

Each of the side plates 1400 is provided with a cutout 1411 for enabling the stops 1374 to be pushed onto the stop bar 1375, which is provided along its entire length with a series of notches 1412 for receiving the side plates. The bar 1375 is provided at either end with tenons (Figure 45), which are received within brackets mounted near either end of the "I"-bar 1266, where they are held by means of retaining pins 1415.

As shown in Figure 23, each stop 1374 is adapted to be retained on the bar 1375 by means of a latch 1417, which is pivoted to the side plates of the stop at 1418 and is provided with a hook portion 1419, which is urged into engagement with the flanged portion of the bar by means of a torsion spring 1420. A card-holding element 1421 is secured to the top portion of the latch and is adapted to receive and retain therein a card 1422 bearing printed information identifying the stop to which it is secured.

In order to protect the stops and the stop bar from dust and dirt, a cover 1423 (Figure 8) is provided. Secured to either end of this cover is a stop 1374, from which the function control plates 1405 and the stop block lugs have been removed, thereby providing a simple means for fastening the dust cover onto the bar 1375. The cover 1423 is provided on its forward face with a card-receiving strip 1424, which is adapted to receive and hold an identifying card 1425 consisting of the columnar headings of the bookkeeping form with which the particular bar and its assembled stops are intended to be used.

*Forward tabulation control mechanism*

In order to enable the present machine to perform its bookkeeping functions, means is provided for enabling the traveling carriage to be tabulated from one columnar position to another while traveling in either its forward direction or its reverse direction, so as to enable the amounts set up on the keyboard to be printed in the proper columns of the bookkeeping form. The tabulation control mechanism utilized in the present machine is extremely flexible in character and may be controlled either from special keys, from the motor bars, or from the traveling paper carriage itself.

As illustrated in Figure 47, the mechanism for controlling the tabulating movements of the carriage in the forward direction comprises a tabulation stop arm 1426, which is provided with an abutment face 1427, which is adapted to cooperate with the forward tabulation stop formed on the stop block 1382. The tabulation or "tab" stop arm 1426 is pivotally mounted on a stud 1428 secured to a forward tabulation lever 1429, which lies just behind the angle bar 216 and is supported on the frame stud 1280 by means of an elongated slot 1430. The lever 1429 is urged to move toward the right, as viewed in Figure 47, by a spring 1431, and to rotate in a clockwise direction about the stud 1280 by a spring 1436 (Figure 48). The action of these springs is resisted by a square stud 1432, which lies beneath the right-hand end of the lever 1429 and which is secured to the rear face of the angle bar 216. The stud cooperates with a shoulder 1433 formed on the lever 1429 and prevents the lever from being moved toward the right or being rotated under the influence of the springs 1431 and 1436.

Also pivotally mounted on the stud 1428 between the lever 1429 and the arm 1426 is a tab stop setting arm 1434, which is urged clockwise thereabout by means of a spring 1435 so as to cause the bottom edge of this arm to bear against the square stud 1432. The tab stop arm 1426 carries a stud 1441, which is urged into contact with the lower edge of the setting arm 1434 by means of a spring 1442, which is stretched between downwardly-extending tabs formed on the arms 1426 and 1434. The right-hand end of the setting arm 1434 is provided with a pair of notches 1443 and 1444, which are adapted to cooperate with a pawl 1445 (Figure 48), which is pivotally mounted on a stud 1446 secured to the angle bar 216. The upper end of the pawl 1445 is normally urged toward the notches by means of a spring 1447 but, in the normal position of the parts, as shown in Figure 48, is prevented from engaging therewith by means of a triangular plate 1448 secured to the right-hand end of the lever 1429, which bears against an arm 1449 provided on the pawl 1445.

When the tab stop arm 1426 is in the position shown in Figure 48, the abutment face 1427 lies out of the path of the tab stops 1381, 1392, and 1393 (see also Figure 47). The tab stop arm, however, may be moved from this "home" position into any one of three raised positions, as shown by the dot-and-dash lines in Figure 47. When the arm is moved to its highest or "normal tab" position, it will lie in the path of travel of any of the stops 1381, 1392, or 1393. When it is moved to its next-to-highest or "skip tab" position, it will lie in the path of the tab stops 1392 and 1393 but will be out of the path of the stop 1381. When the arm is in its lowest active position, it will be set for what is known as a "hold skip tab" operation and will cooperate only with the tab stop 1393 and will pass freely beneath the stops 1381 and 1392. In the present embodiment of the invention shown in the accompanying drawings, the tab stop arm can only be moved to its lowest or "hold skip tab" position under the control of the "Skip" motor bar 2051 (Figure 44).

As previously mentioned, the tab stop arm may be set to these positions either under the control of a tab key, under the control of the motor bars, or by the traveling paper carriage itself. The means for setting the tab stop arm under the control of the tab key will now be described, the means for setting this arm under the control of the motor bars and the traveling paper carriage being explained in a subsequent portion of this specification.

As shown in Figure 49, a "Tab" key 1450 is mounted on the end of a key lever 1451, which is pivoted on a stud 1452 mounted on the right side frame 215. Secured to the key lever 1451 by means of a hub 1453 is an arm 1454, which is urged to rotate in a clockwise direction by means of a spring 1455. This will cause the key 1450 to be maintained in an elevated position, with a stud 1456 mounted on the key lever held against the under side of a block 1457 secured to the right side frame. The rear end of the arm 1454 is adapted to cooperate with a stud 1458 mounted on the forward end of a lever 1459, which is pivotally mounted on a stud 1460 secured to the side frame 215. The lever 1459 is urged counter-clockwise by means of a spring 1461, so as to assist the spring 1455 in urging the stud 1456 against the block 1457. Rotation of the lever 1459 in a clockwise direction is limited by a block 1462 secured to the right side frame, thereby limiting the extent to which the "Tab" key 1450 may be depressed.

Secured to the rear end of the lever 1459 is the lower end of a wire link 1463, the upper end of which (Figure 48) is provided with a clevis by means of which the link is pivotally secured to a lifting lever 1464, which is pivotally mounted on the stud 1371. A lifting dog 1471 is pivoted to the left-hand end of the lifting lever at 1472 and is urged clockwise by means of a spring 1473. Movement of the dog under the influence of the spring is limited by the engagement of a projection formed thereon with a stud 1474 mounted on the lever 1464. The upper end of the dog lies beneath a lug 1475 formed on the stop setting arm 1434 (see also Figure 47) and also beneath a lug 1476 formed on the lever 1429. Consequently, when the "Tab" key 1450 is depressed so as to cause the wire 1463 to be pulled down, the dog 1471 will be lifted and engaged with the lugs 1475 and 1476 to thereby elevate the arm 1434 and the right-hand end of the lever 1429. This will cause the shoulder 1433 to become disengaged from the square stud 1432 and permit the lever 1429 to escape to the right under the influence of the spring 1431, so as to bring a shoulder 1477 formed thereon into engagement with the square stud. As this occurs, the lug 1476 will slide off the top of the dog 1471, which is prevented from moving to the right by the stud 1474, thereby permitting the upper end of the dog to move into line with the recess 1470 formed on the under side of the lever 1429. As the lever is elevated, the triangular plate 1448 will release the pawl 1445, and, when the lever moves to the right, the stop setting arm 1434 will move therewith and engage with the tooth on the pawl. The lug 1475 is of sufficient width to prevent its becoming disengaged from the lifting dog when the arm 1434 moves to the right, and continued upward movement of the dog will cause the arm to be elevated a corresponding distance. The pawl 1445 will then engage with either the notch 1443 or 1444, depending upon the height to which the dog is elevated by the "Tab" key 1450. In the machine shown and described herein, the "Tab" key is provided with sufficient throw to elevate the dog to a point where the pawl will engage with the notch 1444. The tab stop setting arm will thus be held in its elevated position and will therefore yieldingly hold the tab stop arm 1426 also in elevated position, these two arms moving together as a unit by virtue of the spring 1442, which holds the stud 1441 against the under side of the arm 1434. If the stop setting arm 1434 is elevated to a sufficient height to permit the pawl 1445 to engage with the notch 1444, the abutment face 1427 on the tab stop arm will be held in its highest or "normal tab" position, whereas, if the pawl engages with the notch 1443, the abutment face will be held in its intermediate or "skip tab" position. In any event, the tab stop arm is yieldably held in its elevated position by the spring 1442 and may be depressed while the arm 1434 remains in its "set" or elevated position by the stretching of the spring 1442. Thus, if a reverse tabulation operation should take place while the arm 1426 is held in one of its raised positions, any of the tab stops 1381, 1392, or 1393 striking against an inclined face 1478 formed on the arm will depress the arm and permit the stop to ride thereover without injury to the tabulating mechanism.

As shown in Figure 48, the lever 1429 has a depending arm 1479, which bears a stud 1480 adapted to cooperate with the lower end of an arm 1481, which is integral with the arm 1372, as shown in Figure 46. Hence, when the lever 1429 is lifted off of the square stud 1432 and moved to the right by the spring 1431, the stud 1480 will engage the arm 1481 and rock the arm counter-clockwise, so as to cause the ear 1373 to lift the escapement pawls 1283 and 1284 out of engagement with the rack teeth 1291 and so free the carriage for movement. Inasmuch as the hydraulic drive mechanism is normally conditioned to move the traveling carriage in a forward direction, the carriage will be resiliently urged to move toward the left, as viewed in Figures 47 and 48, until one of the tab stops strikes against the abutment face 1427 on the tab stop arm. When this occurs, the arm will be forced to the left, thereby carrying the lever 1429 to the left against the urgency of the spring 1431 until the stud 1480 releases the arm 1481 and thereby allows the escapement pawls to again engage with the rack teeth and stop the carriage. This movement of the lever 1429 to the left will cause it to move off of the square stud 1432 and it will then be moved down by the spring 1436 to the position shown in Figure 48, where the square stud engages the shoulder 1433 on the lever. The triangular plate 1448 will engage the arm 1449 on the pawl 1445 and move the pawl out of engagement with the notches on the tab stop setting arm, so as to permit this arm to be lowered under the urgency of the spring 1435 until the under side of the arm is brought to bear against the square stud 1432. The tab stop arm 1426 will also be lowered to its ineffective position, as shown in Figure 47, and the parts will thus be restored to their normal positions, ready for another tabulating operation.

It is to be observed that, even though the "Tab" key be held depressed after one of the tab stops strikes against the abutment face 1427, the tab stop arm 1426 will none the less be restored to its home position by virtue of the flexible connection between the dog 1471 and the lever 1464. As a result of this construction, when the lever 1429 is moved to the left by the engagement of a tab stop against the abutment face 1427, the left-hand side of the lug 1476 will engage the upper end of the lifting dog 1471 and rotate it in a counter-clockwise direction against the urgency of the spring 1473. The lug 1475, formed on the tab stop setting arm 1434, will also engage with the dog 1471 and rock it still further counterclockwise until the latter arm is once again in its home position, resting on the square stud 1432. The tab stop arm 1426 will therefore be lowered to its ineffective position, even though the tab key be held depressed by the operator and cannot be again lifted by the use of this key until it has been released and depressed a second time.

In general, then, the operation of the tabulating mechanism is as follows: The tab stop arm 1426 and its abutment face 1427 are elevated to a predetermined height, so as to cooperate with a selected one of the tab stops 1381, 1392 and 1393. At the same time, the escapement pawls are disabled and the traveling carriage is released for movement in a forward direction. When one of the tab stops strikes against the abutment face, the tab stop arm will be moved toward the left and permitted to drop back to its inactive position, and at the same time the escapement pawls will be released and permitted to once again engage with the rack teeth so as to hold the carriage in its new position.

Split platen

The traveling paper carriage of the present machine may be equipped with a conventional form of platen, which is of one-piece construction and which may be line-spaced from one end or the other as may be desired, or the platen may take the form shown in Figure 16 of the drawings, wherein a split type of construction is illustrated, thereby enabling independent line-spacing operations of the left- and right-hand sections of the platen, or the two may be optionally locked together so as to form a unitary platen in case this should become necessary or desirable.

As illustrated in Figure 16, the platen 539 is supported between the two end housings 1261, there being provided within each of these housings a line-spacing mechanism to be described herein later. The platen itself comprises a left-hand core 1605 and a right-hand core 1606, preferably though not necessarily constructed of wood, both of the cores being covered with a rubber facing material 1607 so as to furnish a resilient surface against which the type members of the machinery may impinge.

Secured to the inner end of each core is a flanged hub 1608, these hubs being freely rotatable on a tube 1609 extending through the center of the platen 539. The tube 1609 is necked down at either end so as to form a bearing surface for a flanged hub 1610 secured to the outer end of each of the cores 1605 and 1606. Received within the left-hand end of the tube 1609 is a shaft 1611, which has pinned thereto a collar 1612, on which is formed a tenon 1613, which engages with a recess of similar shape and size cut in the end of the tube 1609. A similar construction is provided for the right-hand section of the platen, a shaft 1614 being received within the right-hand end of the tube 1609 and having pinned thereto a collar 1615, which is provided with a tenon which meshes with a notch formed in the right-hand end of the tube. It will thus be seen that the tube 1609 and the shafts 1611 and 1614 are connected together so as to operate as a single unit.

Rotatably mounted on the shaft 1611 is a tube 1616, which is journaled within a bushing 1617 secured to the inner casting 1262, the tube being provided with a flange on its left-hand end and provided with a hand knob 1618. The tube 1616 is secured to the left-hand flange 1610 by means of screws 1619, which screw into tapped holes provided in the outer hub of the flange and extend into holes provided in the tube 1616. Thus, when the hand knob 1618 is revolved, the left-hand section of the platen will likewise be rotated, while the right-hand section will remain stationary.

The right-hand section of the platen is provided with a similar construction, a tube 1620 being journaled in a bushing 1621 secured to the inner casting 1262, the tube being provided with a flange on its right-hand end, where it is fitted with a hand knob 1622. The tube 1620 is secured by screws 1623 to the flanged hub 1610 of the right-hand section, so that, when the hand knob 1622 is rotated, the right-hand section of the platen will likewise be turned. In addition, however, the tube 1620 is joined by a pin 1624 with the shaft 1614, so that, when the hand knob 1622 is rotated, the tube 1609 and the shaft 1611 will likewise be revolved. Hence, the right-hand and left-hand sections of the platen may be independently rotated by the hand knobs provided on either end of the mechanism, the right-hand knob 1622 rotating the tube 1609 and the shaft 1611, in addition to its corresponding section of the platen.

Pinned fast to the shaft 1611 is a flanged hub 1625 (see also Figure 18) provided with a pair of diametrically opposed notches 1626, which are adapted to receive a pair of pins 1627 mounted in a hand knob 1628. The hand knob 1628 is slidable on the shaft 1611 and is adapted to be retained thereon by a collar 1629, which is pinned to the end of the shaft. The hand knob 1628 is also arranged to be yieldably held in either of two positions by means of a spring-pressed pin 1630 mounted in the knob, which cooperates with either one of two grooves 1631 cut in the shaft 1611.

As shown in Figure 18, the flange on the end of the tube 1616 is provided with a pair of diametrically opposed holes 1632, which are adapted to receive the ends of the pins 1627 when the knob 1628 is moved to its innermost or right-hand position on the shaft 1611. Since the shaft 1611 and the tube 1616 are relatively rotatable, it will likely be necessary for the operator to rotate the hand knob 1628 and feel for the holes 1632 at the same time that the knob is pushed inwardly. When the pins 1627 are engaged with the holes 1632, the tube 1616 will be locked to the shaft 1611, thereby causing the left-hand and right-hand sections of the platen to be locked together and to rotate as a single unit. Thus, the split construction of the platen may be modified at will into a conventional or unitary type of platen by proper manipulation of the hand knob 1628.

Secured to the tube 1616 for rotation therewith is a disc 1633 (Figures 16 and 20), which is provided with suitable apertures for receiving the left-hand ends of three pins 1634, which are secured at their right-hand ends to a flanged collar 1637, which slips over the tube 1616. The pins also pass through three holes provided in a serrated disc 1635 (see also Figure 19), which disc is urged toward the left, as viewed in Figure 16, by means of compression springs 1636 surrounding each of the pins 1634 and bearing against the disc 1635 and the collar 1637. As shown in Figure 16, the serrated periphery of the disc 1635 is formed with a slight bevel, and the serration on the disc are adapted to engage in corresponding serrations formed on the inner surface of a cylindrical driving member 1638, which is journaled on the periphery of the disc 1633 and the flanged collar 1637. The driving member is also provided with ratchet teeth 1639, which cooperate with a driving pawl 1640 (see also Figures 14 and 15), which is operated in a manner to be described more fully hereinafter, so as to cause line-spacing movement of the platen.

The disc 1633 is also provided with circular apertures within which are received steel balls 1641, which also co-operate with countersunk recesses formed in a variable line-finding knob 1642, which is journaled on the tube 1616. This knob is provided with a pair of pins 1643, which pass through elongated slots 1644 provided in the flange on the end of the tube 1616.

As also shown in Figures 14 and 15, a roller 1650, pivotally mounted on the end of a lever 1651 pivoted on a stud 1652 secured to the inner casting 1262, is urged into engagement with the ratchet teeth 1639 by means of a spring 1653. Hence, when the hand knob 1618 is rotated by the operator, the serrated disc 1635 and the driving member 1638 will likewise be rotated, and the detent roller 1650 will yieldingly hold the left-hand section of the platen in any particular line-spaced position to which it is moved. Thus, the knob 1618, the ratchet teeth 1639, and the detent roller 1650 constitute the conventional or customary type of line-finding mechanism utilized in machines of this character. However, if the variable line-finding knob 1642 is rotated, the steel balls 1641 will be cammed out of the countersunk recesses formed in the knob against the action of the springs 1636, as a result of the resistance placed on the driving member 1638 by the detent roller 1650. The pin-and-slot connection 1643, 1644 is provided for the purpose of enabling the knob 1642 to be moved a slight distance in either direction relative to the knob 1618, so as to cause the balls 1641 to be cammed to the right, as viewed in Figure 16. This will cause the serrated disc 1635 to be moved to the right sufficiently far to disengage the serrations thereon from the internal serrations formed on the driving member and thus permit the tube 1616 and the left-hand section of the platen to be rotated independently of the driving member 1638. When the knob 1642 is released, the spring 1636 will press the disc 1635 and the balls 1641 to the left, so as to re-engage the serrations on the disc 1635 with those on the member 1638, thus again re-establishing the driving connection between the member 1638 and the tube 1616. The platen may thus be rotated to practically any position desired, depending upon the fineness of the serrations cut in the disc 1635.

A knob 1654, similar to the knob 1642, is provided on the right-hand end of the platen mechanism for providing variable line-finding movement for the right-hand section of the platen. Inasmuch as the mechanism controlled by the knob 1654 is identical with that controlled by the knob 1642, a detailed description of this mechanism is believed unnecessary.

When the platen illustrated in the drawings is made "solid" by moving the knob 1628 toward the right, as viewed in Figure 16, so as to couple the tube 1616 with the shaft 1611, the tube 1669, and the shaft 1614, any attempt on the part of the operator to use the left-hand variable line-finding knob 1642 will be found futile, since a roll corresponding to the detent roll 1650 will be in engagement with the ratchet teeth formed on the driving member 1655 at the right-hand end of the platen mechanism. Hence, although the knob 1618 and the tube 1616 may be uncoupled from the driving member 1638 and its related detent roll 1650 through the use of the knob 1642, this will not affect the connection between the tube 1620 and its associated driving member 1655 at the right-hand end of the mechanism. In order to remedy this difficulty, means is provided for enabling the operator of the machine to disengage either of the detent rollers 1650 from engagement with the teeth on their related driving members 1638 and 1655, thereby permitting the variable line-finding knob at the opposite end of the platen to be effective to provide the desired variable line-finding movement of the platen when the latter is made "solid." The mechanism for accomplishing this purpose will be described in the next section of this description.

*Line-spacing mechanism*

The paper-feeding mechanism of the present machine may be actuated either by a key located on the typewriter keyboard or under the control of the traveling paper carriage in preselected columnar positions thereof. The paper-feeding mechanism is arranged to be power-operated under the control of a paper-feeding clutch shown in Figures 3, 4, 25 and 26, which is rendered effective under the control of the aforementioned instrumentalities.

As shown in Figure 6 of the drawings, a "Paper Feed" key 1656 is secured to a key lever 1657 pivoted on the rod 453. The rear end of the key lever cooperates with a one-revolution actuating cam 1658, which is supported in a hanger 1659 pivotally mounted on the rod 465.

The hanger is provided with a depending arm 1660, to the lower end of which are connected a spring 1661 and the forward end of a link 1662. The spring 1661 urges the hanger counter-clockwise about the rod 465 and maintains a finger, formed on an adjustment bracket 1663 secured to the hanger 1659, in engagement with the underneath surface of the rod 438. The rearward end of the link 1662 is pivotally connected to the lower end of an arm 1664, which is fast on a shaft 1665 journaled at its left-hand end in the bracket 287 (Figure 37) and at its right-hand end in a similar bracket (not shown). Also fast on the shaft 1665 is an arm 1666 (Figure 37), which is pivotally connected to the forward end of a link 1667, the rear end of which is pivotally connected to an arm 1668 loosely pivoted on a paper feed tube 1669 (see also Figure 38). An arm 1670 is secured to the tube 1669, this arm being provided with a pin 1671, which lies beneath a finger 1672 formed on the arm 1668. Hence, when the "Paper Feed" key 1656 is depressed, the actuating cam 1658 will be driven through one revolution by the driving roller 485, thereby causing the shaft 1665 to be reciprocated first clockwise and then counter-clockwise, as viewed in Figures 6 and 37, so to cause the finger 1672 first to depress the pin 1671 and then to release it. The tube will thus be first rocked counter-clockwise and then released for return movement to the position shown in Figure 37 by means to be described later.

The tube 1669 is journaled on a carriage throat shaft 1673, which is journaled at its right-hand end, as viewed from the front of the machine, in the bracket 924 and at its left-hand end in a bracket 1674, which is secured by screws 1675 to the casing 319 of the hydraulic drive mechanism, as shown in Figures 3 and 4. As shown in Figure 3, the left-hand end of the tube 1669 terminates in a sleeve 1676, to which is secured a control plate 1677 which is urged clockwise, as viewed in Figure 25, by a spring 1678. This will cause the left-hand edge of a notch 1679, formed in the plate 1677, to engage against a limit stud 1680 secured to the bracket 1674. Thus, when the tube 1669 is rocked counter-clockwise, as viewed in Figures 25 and 37, by the finger 1672, the spring 1678 will be stretched and will restore the sleeve to its original position when the pin 1671 is released by the finger.

Pivotally mounted on a stud 1681 secured to the plate 1677 is a non-repeat pawl 1682, which is urged clockwise about the stud 1681 by a spring 1683, which is stretched between a stud 1684, mounted in the pawl 1682, and a stud 1685, mounted on a tripping arm 1686 (see also Figure 26), loosely pivoted on the shaft 1673. As also shown in Figure 3, the stud 1684 bears against the edge of the plate 1677 so as to limit the clockwise rotation of the pawl 1682 under the influence of the spring 1683.

The rear end of the pawl 1682 is adapted to engage with the stud 1685 when the control plate 1677 is rocked counter-clockwise and thereby rock the tripping arm 1686 counter-clockwise so as to move a finger 1687, formed thereon, out of engagement with a stud 1688 mounted in the lower end of a clutch control arm 1689. This will permit the arm 1689 to be rocked counter-clockwise by a spring 1690, stretched between a stud mounted on a disc 1691 and a stud mounted on an arm 1692, which is secured to a short shaft 1693 journaled in the disc 1691. The arm 1692 is provided with a notch which engages with a pin 1694 mounted in the clutch control arm 1689.

Secured to the opposite end of the shaft 1693 on the other side of the disc 1691 is a pawl 1700, which is adapted to cooperate with a ratchet 1701 secured to the motor-driven shaft 301 (see Figures 3 and 4). Hence, when the arm 1689 is released by the finger 1687, the arm 1692 will be freed to the action of the spring 1690, which will rotate the arm and the shaft 1693 clockwise, as viewed in Figures 25 and 26, thereby moving the nose of the pawl 1700 into engagement with the ratchet 1701. The disc 1691, which is secured to a hub 1702 loose on the shaft 301 is thus driven counter-clockwise, as viewed in Figures 25 and 26, thereby driving a pair of companion plate cams 1703 and 1704, secured to the hub 1702, in a like direction. Cooperating with the cams 1703 and 1704 are rolls 1705 and 1706, respectively, mounted on a lever 1707, which is pivotally secured to the casting 304 by means of a screw 1708. Hence, for each complete revolution of the cams, the upper end of the lever 1707 is moved first toward the front of the machine or toward the left, as viewed in Figure 25, and then back to its original position.

When the control plate 1677 is restored to its normal position, the tripping arm 1686 will likewise be restored by the spring 1683, so as to bring the finger 1687 again into the path of the stud 1688. When the stud is thus stopped by engagement with the finger, the arm 1689 will be rocked clockwise with respect to the disc 1691, thereby causing the pin 1694 to rock the arm 1692 into the position shown in Figure 26 against the urgency of the spring 1690, so as to remove the pawl 1700 from engagement with the ratchet 1701. The disc and the cams will thus be stopped in their home positions, where they are held by a follower arm 1709 (Figure 4), which is pivoted on a rod 1710 supported at either end by the casting 304 (Figure 3), the follower arm being provided with a roll 1711, which seats in a depression 1712 formed in the periphery of the disc 1691. The roll is resiliently urged into engagement with the periphery of the disc by means of a compression spring 1713 acting on the upper end of the arm 1709 and so holds the disc and the cams in their home positions against the urgency of the spring 1690 and prevents nibbling of the pawl and ratchet driving mechanism.

Means is provided for preventing the disc and the cams from making more than one revolution even though the tube 1669 is held in its counter-clockwise or operated position. This means consists of a restoring lever 1714 (Fig. 26), which is loosely pivoted on the shaft 1673 and which bears a stud 1715 engaging with a slot in the non-repeat pawl 1682. The lever 1714 is also provided with a nose 1716, which lies in the path of a hub 1717 on the pawl 1700 (Figure 4). Thus, as the disc revolves, the hub will strike the nose 1716 and rock the lever 1714 clockwise, with the result that the stud 1715 will rock the pawl 1682 counter-clockwise about the stud 1681 and permit the stud 1685 to ride over the lower surface of the pawl 1682 under the pull of the spring 1683, thereby moving the tripping arm 1686 into its normal position, with a finger 1718 thereof in engagement with the limit stud 1680. The finger 1687 will thus be placed in the path of the stud 1688 and cause the disc and the cams to be stopped after they have made one complete revolution. When the tube 1669 is subsequently released, the spring 1678 will restore the control plate 1677 to its normal position and cause the pawl 1682 to likewise be restored to the position shown in Figures 25 and 26.

Pivotally secured to the upper end of the lever 1707 is a twisted link 1719, the other end of which is pivotally secured to the end of an arm 1720, which is secured to a vertical paper feed shaft 1721 (see Figures 1, 3, 5, 24 and 25). As shown in Figure 1, the lower end of the paper feed shaft is journaled in the machine base 213, while its upper end is journaled in the bracket 348. Secured to the upper end of the shaft is an operating arm 1722 (Figure 11) bearing a roll 1723 and an upstanding lug 1724. Received between the roll and the lug is a rail 1725 (Figures 8 and 14), which is supported from a tube 1726 by means of a plurality of pillars 1727. The tube 1726 is journaled at either end in the inner castings 1262 of the carriage frame and has secured thereto at either end within the end housings an arm 1728 (Figure 14), which is urged counter-clockwise by means of a spring 1729.

In the present drawings, the paper feed mechanism for the left-hand section of the platen only is illustrated, it being understood that a similar mechanism is provided in the other end housing for line-spacing the right-hand section of the platen.

From the mechanism thus far described, it will be observed that each time the upper end of the lever 1707 is moved toward the front of the machine and back again, the rail 1725 will likewise be moved toward the front of machine and then back to its original position, as shown in Figure 14.

Pivotally connected to the upper end of the arm 1728 is a link 1730, the other end of which is pivotally connected to a line-spacing arm 1731, which is journaled on the bushing 1617. The line-spacing pawl 1640 is pivoted to the arm 1731 at 1732, the end of the pawl being urged toward the teeth 1639 by means of a spring 1733 stretched between a stud 1734 on the pawl and a stud on the arm 1731. Also journaled on the bushing 1617 and lying beside the arm 1731 is a control lever 1735, which is provided with an arcuate cam face 1736, against which the stud 1734 engages so as to maintain the end of the pawl 1640 out of engagement with the ratchet teeth 1639. The control lever has mounted thereon a stud 1737, which cooperates with any one of four notches provided in a detent lever 1738, which is pivotally mounted on the stud 1652 beside the lever 1651 and urged into engagement with the stud 1737 by the spring 1653. The control lever may thus be moved to and retained in any one of four positions, as indicated in Figure 14. When this lever is in the position shown in Figure 14—namely, the "1" position—the arcuate cam face 1736 will maintain the end of the pawl out of engagement with the ratchet teeth until near the end of the forward stroke of the line-spacing mechanism, when the stud will move off the arcuate cam face and allow the pawl to engage with the teeth 1639 and drive the member 1638. The design of the parts is such that the pawl will advance the driving member by one tooth space under these circumstances. When the lever 1735 is moved to the "2" position, the drop-off point of the control surface will be moved closer to the stud 1734, and consequently the pawl will be permitted to engage with the ratchet teeth early enough in the forward stroke of the spacing mechanism to move the driving member 1638 through a distance of two tooth spaces. Similarly, in the "3" position of the lever, the pawl will move into engagement with the teeth at the very beginning of the working stroke and thereby cause the driving member to be rotated through three tooth spaces.

If desired, the line-spacing mechanism may be disabled entirely and the detent roller 1650 lifted out of engagement with the ratchet teeth by moving the lever to its extreme right-hand position, which is marked "N. S." in Figure 14. Movement of the control lever to this position will cause the stud 1737 to enter a notch 1739 provided in the lever 1651 and cam the lever up so as to lift the roller 1650 out of engagement with the ratchet teeth.

In the case of the machine presently being described, means is provided whereby any of the "Reverse Tabulation" keys 1583 (Figure 6), when depressed, may also cause depression of the "Paper Feed" key 1656. As shown in Figure 6, the key lever 1657 for the "Paper Feed" key has secured thereto a bracket 1745, which is formed with a laterally-extending ear 1746, which lies beneath the key levers 1584 for the "Reverse Tabulation" keys. Each of the latter key levers is provided with a slide 1747 having a lug 1748, which is adapted to cooperate with the ear 1746 when the slide is in its forward position, as shown in Figure 6, and cause the "Paper Feed" key to be carried down along with the "Reverse Tabulation" key. If independent operation of the keys is desired, the slides 1747 may be moved toward the rear by means of corresponding finger tabs, so as to remove the lugs 1748 from above the ear 1746 and thus break the connection between the key levers.

Split in line-spacing mechanism

As shown in Figures 17, 21 and 22, the line-spacing mechanism is preferably provided with a split, which will enable either section of the split platen to be line-spaced independently of the other. As shown in these figures, the rail 1725 is made in two sections, with means being provided to selectively couple the two sections of the rail together for a joint operation when such is desired. The tube 1726 is provided with a corresponding split, the reduced and adjoining ends of the tube being supported by a sleeve 1740, which is secured to a bracket 1741 mounted on the rail 1264 by means of screws 1742 (only one shown).

As shown in Figure 17, the rail 1725 is provided on either side of the split with a longitudinally-extending groove 1743 for receiving a coupling tongue 1744, which is secured to a grooved sleeve 1750 slidably mounted on the reduced portion of one of the ends of the tube 1726. A spring-pressed pin 1751 is mounted in the bracket 1741 and is adapted to engage with one of the three grooves provided in the sleeve to thereby hold the tongue in any one of three positions. When the tongue is in the position shown in the drawings, the line-spacing mechanism will be split and the sections of the platen may be operated independently by the arm 1722 (Figure 11). However, when the tongue 1744 is moved to the left, as viewed in Figures 17 and 22, until the spring-pressed pin 1751 engages in the right-hand groove formed in the sleeve 1750, the two sections of the rail 1725 will be effectively coupled together so as to cause simultaneous line-spacing operation of both sections of the platen irrespective of the position of the arm 1722 with regard to the split. When the tongue is moved to an intermediate position—that is, when the pin 1751 is engaged with the middle groove cut in the sleeve 1750—the line-spacing mechanism will be split or not split, depending upon the position of the traveling carriage. That is, if the carriage is in such a position that the operating arm 1722 is engaged with the left-hand section of the rail 1725, as viewed in Figure 22, the line-spacing mechanism will be split, since the tongue will be permitted to move through the cut-out portion 1752 provided in the left-hand section of the rail 1725, and the right-hand section of the rail will remain unoperated. However, when the carriage is in such a position that the operating arm 1722 is in engagement with the right-hand section of the rail 1725, operation of this section of the rail will pick up the tongue 1744 and hence cause the left-hand section of the rail to be operated also, thereby causing joint operation of the line-spacing mechanisms of the two sections of the platen.

When the line-spacing mechanism is in its split condition, the spring 1729 (Figure 14) will serve to hold the section of the rail 1725 which is out of engagement with the operation arm 1722 in its normal position, so that the two sections of the rail will remain in alinement at all times (except when a line-spacing operation is being performed) and thereby permit the carriage to tabulate across the split without the rail 1725 becoming disengaged from the operating arm 1722.

Front feed mechanism

In the present embodiment of the invention, a power-operated mechanism is provided for moving certain compression rolls away from the platen and for causing a front-feed chute to be lowered and rocked away from the platen, so as to enable a ledger card or other desired piece of record material to be fed into the carriage from the front. This type of mechanism is commonly referred to as a "front feed mechanism," and such is the designation given to this mechanism in the present disclosure.

As previously mentioned, the front feed mechanism is power-operated and may be rendered effective either under the control of a key located on the right-hand side of the accounting machine keyboard or under the control of several motor bars, or under the control of the paper carriage itself. As shown in Figures 3, 31 and 32, a clutch mechanism similar to that employed in connection with the line-spacing mechanism serves to connect the front feed mechanism with the power drive. As shown in these figures, the shaft 1673, which is journaled in the bracket 1674, has secured to its left-hand end a control plate 1753, which is urged clockwise by a spring 1754, so as to bring one edge of a notch cut therein against a limit stud 1755 mounted in the left-hand flange of the bracket 1674. The plate 1753, like the plate 1677 for the line-spacing clutch, has pivotally supported thereon a non-repeat pawl 1756, which is urged by a spring similar to the spring 1683 into engagement with a stud 1757 mounted on a tripping arm 1758, which is journaled on a hub 1759 secured to the bracket 1674. The arm 1758 is provided with a finger 1760, which is adapted to cooperate with either of two studs 1761 or 1762 mounted on a clutch control arm 1763. The arm 1763 is provided with a hub 1764, which is loosely journaled on a hub 1765 secured at one end to a disc 1766 and at the other end to a pair of companion plate cams 1767 and 1768. These cams cooperate with rolls provided on a lever 1769, which is pivotally mounted on a shouldered screw 1770 screwed into the casting 304. The disc 1766 has journaled therein a short shaft 1771, to which is secured an arm 1772 (Figure 32) provided with a notch which receives a stud 1773 on the clutch control arm 1763. The arm 1772 is urged clockwise, as viewed in Figure 32, by a spring 1774 stretched between the arm and a stud mounted on the disc 1766. Secured to the shaft 1771 on the opposite side of the disc from the arm 1772 is a pawl 1775, which cooperates with a ratchet 1776 driven by the drive shaft 301. The disc 1766 is provided with a pair of depressions 1777 adapted to cooperate with a roll 1778 mounted on an arm 1779 pivotally supported on the rod 1710 and urged toward the disc by a spring similar to the spring 1713, shown in Figures 3 and 4. The disc 1766 and the cams 1767 and 1768 have two home positions, which are defined by the engagement of the roll 1778 with the two depressions 1777. In these positions, either the stud 1761 or the stud 1762 on the clutch control arm 1763 bears against the end of the finger 1760, thereby holding the arm 1772 in the position shown in Figure 32 against the urgency of the spring 1774. When the finger 1760 is removed from in front of the stud 1761 upon counter-clockwise rotation of the shaft 1673 in the manner hereinbefore described in connection with the line-spacing clutch mechanism, the arm 1772 will be rocked clockwise by the spring 1774 to thereby cause the pawl 1775 to engage the ratchet 1776 and cause the disc and the cams to be rotated counter-clockwise, as viewed in Figure 31. When the stud 1762 strikes against the end of the finger 1760, the arm 1772 will be rocked counter-clockwise so as to disengage the pawl from the ratchet, and roll 1778, engaging with the depression 1777, will hold the disc, the cams, the arm 1772, and the clutch control arm 1763 in their rest positions, as illustrated in Figures 31 and 32.

As in the case of the line-spacing clutch mechanism, means is provided for causing the finger 1760 to be restored to the position shown in Figure 32, so as to be in a position to engage the stud 1762 even though the shaft 1673 is retained in its moved or counter-clockwise position. This is accomplished by means of a restoring lever 1796, which is loosely pivoted on the shaft 1673 and carries a stud 1797, which engages with a notch formed in the pawl 1756. The lever 1796 has a nose formed thereon which engages, in one instance, with a roll 1780 secured to the disc and, in another instance, with a hub 1795 formed on the pawl 1775 so as to cause the pawl 1756 to be moved out of engagement with the stud 1757 and thereby enable the tripping arm 1758 to be restored to the position shown in Figure 32, despite the fact that the shaft 1673 and the control plate 1753 are held in their counter-clockwise positions. It will thus be seen that, when the parts are in the positions shown in Figure 32 and the shaft 1673 is rocked counter-clockwise, the throat-operating cams 1767 and 1768 will be rotated through an angle somewhat less than 180 degrees, in which position they will remain until the shaft is again operated. On the next operation of the shaft 1673, the cams will move through an angle somewhat greater than 180 degrees, so as to bring the stud 1761 again into engagement with the end of the finger 1760. When the parts are in the positions shown in Figure 32, the throat is closed, as illustrated in Figure 8, and, when the shaft 1673 is rocked counter-clockwise so as to permit the clutch to be engaged and the cams to be rotated until the stud 1762 engages with the finger 1760, the throat will be opened, as illustrated in Figure 10. On the next operation of the shaft 1673, the cams will rotate until the stud 1761 engages with the end of the finger 1760 to thereby close the throat and condition the machine for a printing operation.

As illustrated in Figure 39, a "Carriage Throat" key 1781 is mounted for vertical sliding movement upon studs 1782 mounted in a bracket (not shown), the key being normally held in its raised position, as shown herein, by means of a coil spring (not shown) cooperating with a pin on the key 1781. The lower end of the carriage throat key is provided with a headed stud 1784, which engages with the forward end of the lever 1785, which is pivotally mounted on a stud 1786 secured to said bracket. The rear end of the lever 1785 is provided with a pair of formed-over ears 1787, which are perforated to receive the headed ends of wire links 1788 and 1789. The wire link 1789 is secured at its lower end to a clevis 1790, which is pinned to the end of an arm 1791 secured to the carriage throat shaft 1673 (see also Figure 38). Thus, when the carriage throat key 1781 is depressed, the lever 1785 will be rocked counter-clockwise to thereby lift the link 1789 and rotate the carriage throat shaft 1673 counter-clockwise. As previously explained in connection with Figure 32, this will cause the control plate 1753, secured to the shaft 1673, to be rocked counter-clockwise, thereby tripping the carriage throat clutch and so causing the carriage throat mechanism to be operated by the power shaft 301 in a manner which will now be described.

As shown in Figure 31, the upper end of the lever 1769 is pivotally connected to the forward end of a link 1792 (see also Figure 5), the rear end of which is pivotally connected to an arm 1793 fast on the lower end of a vertical shaft 1794, which is journaled at its lower end in the base 213 and at its upper end in the bracket 348 (see also Figure 24). As shown in Figure 11, an arm 1800 is secured to the upper end of the shaft 1794, this arm being pivotally connected to a link 1801 by means of a stud 1802, which is eccentrically mounted in a disc 1803, which is adjustably secured to the arm 1800. The link 1801 may thus be adjusted with relation to the arm 1800 by rotating the disc 1803. The link 1801 is secured at its other end to a lever 1804 pivotally mounted on a stud 1805 secured to the bracket 348. In this lever is a stud 1806, on which is pivotally mounted an operating plate 1807, which has mounted thereon a pair of rolls 1808, which are adapted to engage a rail 1809 (see Figure 8), which is supported from and travels with the traveling paper carriage of the machine. The plate 1807 is provided with a downwardly-extending pin 1810, which is adapted to engage with a slot 1811 provided in the bracket 348 for guiding the plate as the latter is reciprocated during throat opening and closing operations.

As shown in Figures 8 and 10, the rail 1809 is secured to a tube 1812 by means of a series of pillars 1813 extending between the rail and the tube. The tube is journaled at either end in the inner castings 1262 and has throat-operating arms 1814 secured to either end thereof just within the castings 1262, each of the arms 1814 being pivotally connected at its upper end to a link 1815. While in the present drawings only the front feed mechanism located on the left-hand side of the carriage is shown, it is to be understood that a similar mechanism is employed on the right-hand end of the carriage for simultaneously operating the mechanism located on this end. Accordingly, the following description will be concerned only with the left-hand mechanism, it being understood that the right-hand mechanism is identical therewith.

The forward end of the link 1815 is pivoted on a stud 1816, which is secured to a cam disc 1817, which is journaled on a seat 1818 (Figure 16) provided on the bushing 1617. When the throat mechanism is in its closed position, as illustrated in Figure 8, the high portion of the cam cooperates with a roll 1819 secured on an arm 1820, which is fast on a square shaft 1821. This shaft is journaled at either end of the carriage in holes (Figure 16) bored in the inner castings 1262 and has mounted thereon a plurality of spring-biasing yokes 1822, which are interspersed between compression roll yokes 1823 (Figure 9) also mounted thereon. Each of the biasing yokes 1822 is provided with a square hole formed in each of its spaced side arms for receiving the square shaft 1821, and a circular aperture is formed near the outer end of each of these side arms for receiving a long coil spring 1824, which is threaded through these apertures and also through similar apertures provided in spaced side arms of compression roll yokes 1823, this spring being anchored at either end in an aperture 1825 provided in each of the arms 1820, which are located on either end of the square shaft 1821. Pivotally supported between the side arms of the compression roll yokes 1822 are compression rolls 1826, which are formed of rubber or other suitable material and which are adapted to be resiliently urged into engagement with the surface of the platen 539 when the throat mechanism is in its closed position, as illustrated in Figure 8. The side arms of the compression roll yokes are loosely journaled on the shaft 1821 by means of circular holes 1827. When the throat mechanism is in its closed position, as indicated in Figures 8 and 9, the high portion of the disc 1817 cooperates with the roll 1819 to hold the square shaft 1821 in the position shown in these two figures, in which the spring-biasing yokes 1822 urge the spring 1824 toward the platen and therefore cause the compression rolls 1826 to be pressed into engagement with the platen 539. However, when the carriage throat mechanism is opened by movement of the rail 1809 toward the rear of the machine, thereby causing the cam disc 1817 to be rotated counter-clockwise so as to force the roll 1819 into a recess 1828 formed in the cam, the square shaft will be rocked counter-clockwise, thereby moving the biasing yokes 1822 away from the platen and moving the compression rolls out of engagement with the platen.

At the same time that the compression rolls are moved out of engagement with the platen, a front feed chute 1829, which may be made of any suitable transparent material, is lowered into the position shown in Figure 10 to thereby complete the opening of the front feed throat mechanism. The chute 1829 is provided near its lower edge with a pair of longitudinally-extending grooves 1830, within which may be deposited a suitably colored pigment, so as to provide sharply defined lines for indicating the printing line of the machine. The chute is secured at either end by screws or other suitable fastening means to a bracket 1831, which is pivoted at 1832 to a sector 1833 journaled on the seat 1818 formed on the bushing 1617. The sector 1833 is provided with gear teeth which mesh with the corresponding gear teeth of a spur gear 1834 secured to a shaft 1835, which extends across the carriage and is journaled at either end in the inner castings 1262. Thus the sectors 1833, located at either end of the platen, are constrained to rotate in unison and thereby insure parallel motion of the chute 1829 as it moves from opened position to closed position and vice versa. As shown in the drawings, a roll 1836 is provided on the bracket 1831, this roll cooperating with an aperture 1837 provided in the casting 1262 to limit and guide the motion of the chute 1829.

The sector 1833 is provided with a stud which cooperates with a slot formed in a spring anchor 1838, which is secured to the forward end of a solid coil spring 1839, which is secured at its rear end to a latch 1840. This latch is pivotally mounted on a stud secured in the rear end of the link 1815 by means of an elongated slot 1841 formed in the latch. The latch is adapted to cooperate with a flattened stud 1842 secured to the casting 1262 and is provided with a forwardly-extending tail 1843, which is adapted to rest on a stud 1844 secured to the link 1815.

The operation of this mechanism is as follows: When the throat mechanism is in its closed position, as shown in Figure 8, the latch 1840 is engaged with the stud 1842 to thereby hold the front feed chute 1829 resiliently in its raised position and so relieve the rolls 1808 of the thrust which would otherwise be imposed thereon by the rail 1809 due to the weight of the chute. However, when the rail 1809 is moved toward the rear of the machine, the stud 1845 will move toward the left end of the slot 1841, thereby rotating the latch 1840 clockwise about the stud 1844 and causing it to be disengaged from the stud 1842. The spring 1839 will now act as a link and cause the spring anchor 1838 to be moved toward the front of the machine or to the left, as viewed in Figures 8 and 10, thereby permitting the chute 1829 to drop by gravity into the position shown in the latter figure. The carriage throat is now open, and a ledger card 1850 or other suitable piece of record material may be fed into the carriage from the front side of the platen, after which the throat mechanism may be closed so as to securely clamp the card in position, as shown in Figure 8. If it is now desired to ascertain the line on which printing will occur when the machine is operated, the chute 1829 may be pushed down until the roll 1836 seats in a depression 1851 provided in the aperture 1837. When the chute is thus pushed down, the sector 1833 will be rotated counter-clockwise, thereby stretching the spring 1839. Hence, when the chute is released, the spring will rotate the sector 1833 clockwise to thereby lift the chute into the position shown in Figure 8. When the throat mechanism is in its open position, as indicated in Figure 10, and it is desired to ascertain the line upon which printing will occur, the chute 1829 is pushed toward the rear of the machine, so as to seat the roll 1836 in the depression 1851, which will bring the chute into the proper position in order for the guide lines thereon to indicate the printing line.

It will thus be seen that, when the throat is open, the ledger card 1850 will be guided around the platen by means of the front feed chute 1829, the yokes 1823, the compression rolls 1826, and a curved plate 1852 (see Figure 12), which is secured to the L-bar 1265. The card is then guided into a paper guide channel 1853 (see also Figure 13), which is provided with an upper lip 1854 for deflecting the card into the channel and a lower lip 1855, which is adapted to engage beneath a lip provided on the rear edge of the plate 1852 to thereby retain the front end of the guide 1853 in its proper position, as shown in Figure 12. The guide also has secured thereto a block 1856, which engages with the front surface of the bar 1264, so as to prevent the lip 1855 from becoming disengaged from beneath the plate 1852. The paper guide 1853 is also provided with spring clamps 1857, which engage with the flange of the rail 1264 and thus clamp the guide thereagainst.

The guide 1853 shown in Figures 12 and 13 serves to guide the right-hand edge of the ledger card, a similar guide being provided for guiding the left-hand edge thereof.

*Stop sensing mechanism*

As mentioned earlier herein, nearly all of the functions performed by this machine may be controlled by the traveling paper carriage. In order to relieve the traveling carriage of the load which would be imposed upon it if it were required to depress function control levers or like elements in order to effectuate these controls a sensing mechanism is provided for sensing the function control plates 1405 carried by the stops 1374 while the carriage is located in one of its various columnar positions. As shown in Figures 27 and 28, this mechanism consists of sensing fingers 1889. As shown in Figures 28, 29, and 30, the sensing fingers are formed on the upper ends of sensing members, which may have any one of four different forms, as indicated by the reference numerals 1890, 1891, 1892, and 1893. The sensing members are all guided at their upper ends by means of slots formed in a guide plate 1894, secured to a square post 1900, which in turn is secured to the angle bar 216. At their lower ends, each of the members is pivotally connected to one of a series of sensing levers, which are adapted to be controlled by the fingers 1889 as the result of their engagement with the stepped control plates 1405. Thus, each of the sensing members 1890 is pivotally connected to the right-hand end of a sensing lever 1901, which levers are alternately mounted on studs 1902 and 1903 located in a frame plate 1904, which is supported from the vertical portion of the angle bar 216 by means of short posts 1905. Each lever is urged counter-clockwise by a spring 1906, so as to tend to move the sensing fingers into engagement with the plates 1405. Near its left-hand end, each lever 1901 is provided with a pair of guide fingers 1907 and 1908, which cooperate with grooved studs 1909 and a slotted guide plate 1910, respectively, in order to guide the levers in their up-and-down movements. Lying beneath a finished surface 1911 formed on the lower edge of each of the levers 1901 is a sensing mechanism control slide 1912 which is mounted for vertical sliding movement on a stud (not shown) and the stud 824 (Figure 33) secured to the side frame 214. The slide 1912 is provided near its lower end with a pin 1914, which engages with a slot provided in a lever 1915, which is pivoted on a stud 1916 (Figure 33) mounted in the left side frame. The lower end of the lever 1915 carries a stud 1917, which cooperates with a bifurcation provided in the upper end of a lever 1918, which is loosely journaled on the shaft 802. The lever 1918 is provided with a depending tail 1920, which is adapted to cooperate with rolls 1921, 1922, and 1923, which are mounted on studs supported by plate cam 1147.

When the main cam shaft 253 rotates counterclockwise, as viewed in Figure 33, the roll 1921 will move from under the tail 1920, thereby permitting the springs 1906 to force down the control slide 1912 and thus permit the sensing fingers 1889 to move upward into engagement with the lower edges of the plates 1405. As illustrated in Figure 28, each of the plates 1405 is provided on its lower edge with two abutment surfaces, one adapted to cooperate with the left-hand row of sensing fingers 1889 and the other being adapted to cooperate with the right-hand row of fingers. Either of the abutment surfaces may be cut to any one of four different lengths or heights, the "Zero" length indicated in Figure 28 being the equivalent of no plate at all, the "A" or "Addition" length being effective to stop the fingers just short of their full travel, the "S" or "Subtraction" length being effective to stop the fingers in an intermediate position, and the "T" or "Total" length being effective to stop the fingers after they have moved but a very short distance. The sensing fingers 1889 will be restored to their lowered positions, as shown in Figure 28, toward the close of the machine cycle by means of the roll 1923 (Figure 33) engaging with the tail 1920 to thereby elevate the slide 1912. After the roll 1923 moves beyond the tip of the tail 1920, the succeeding roll 1922 will serve to keep the slide elevated until the roll 1921 engages with the tail, so as to retain the slide elevated at the end of the machine cycle, as shown in Figure 33.

In order to insure that the slide 1912 is lowered at the proper time in the machine cycle, the lever 1918 has secured thereto an arm 1924, the lower end of which is adapted to be engaged by a stud 1925 secured to the right-hand face of the cam 1147. This provides a positive means for supplementing the action of the springs 1906 in depressing the slide 1912, thereby insuring that the lever 1915 will be rocked clockwise in the early part of the cycle.

The control slide 1912 is provided near its upper edge with a notch 1926, which engages with the rounded end of a lever 1927 (Figures 28 and 30) pivoted on a stud 1919 secured to the frame plate 1904. The other end of this lever is provided with a stud 1928, which works in a slot provided in one of the side arms 1930 of a yoke 1929. The side arms 1930 are mounted for pivotal movement on a stud 1931, mounted in the frame plate 1904, and the yoke 1929 is arranged to overlie a series of lugs 1932, formed on the sensing members 1892 and 1893, to thereby control the sensing action of the fingers 1889 associated therewith. It will thus be evident that, when the slide 1912 is lowered, the yoke 1929 will be raised to thereby permit the sensing fingers on these sensing members to be lifted into engagement with the control plates 1405.

As shown in Figure 29, the member 1892 is pivotally secured to an arm 1933, which is pivotally mounted on a stud 1934 secured to the frame plate 1904. Also pivotally mounted on the stud 1934 adjacent to the arm 1933 is an arm 1935 bearing a stud 1936, which underlies a right-hand extension of the arm 1933. The latter extension is maintained in contact with the stud 1936 by means of a spring 1937 connected between the extension and a stud on the arm 1935. This assembly, consisting of the arms 1933 and 1935, is urged clockwise about the stud 1934 by means of a spring 1938, thereby urging the member 1892 in an upward direction so as to maintain the lug 1932 in engagement with the yoke 1929. In the present instance, there are three of the sensing members 1892, each of which is pivotally connected to a sensing lever assembly similar to that formed by the arms 1933 and 1935. These are shown in Figure 27, wherein the arms corresponding to the arm 1935 are designated by the reference numerals 1939 and 1940. These arms are pivotally mounted on the stud 1934 and are flexibly connected to arms similar to the arm 1933, which in turn are pivotally secured to the members 1892, all as shown and described in connection with Figure 29. The arm 1935 is connected with the carriage throat and paper feed mechanism and is associated with the sensing finger No. 16. The automaticity and flexibility of the machine is further enhanced by several function control slides, which are sensed by a feeler mechanism which in turn controls the functioning of the machine. The paper feed slide and the throat control slide and their related mechanisms will now be described in detail, so as to afford a complete understanding of the manner in which the paper feeding and throat opening and closing functions are controlled thereby. As shown in Figures 34 and 37 the paper feed slide 2182 is provided with elongated slots by means of which it is slidably mounted on the studs 2081 and 2082. The slide is resiliently urged toward the front of the machine by means of a spring 2184 but is normally retained in its rearward position against the urgency of this spring by means of a rod 2185, secured in the upper end of a lever 2186, which is pivotally mounted on a fixed stud 2187. To the lower end of the lever 2186 is pivotally connected the forward end of a link 2188 (Figure 34), the rear end of which is pivotally connected to the upper end of a follower arm 2189, which is rotatable on the shaft 923 and is provided with rolls which cooperate with a pair of companion plate cams 2190 and 2191, which are secured to the main cam shaft 253. Hence, during each cycle of operation of the machine, the rod 2185 will be moved toward the front of the machine, thereby permitting the slide 2182 to be moved forwardly under the influence of the spring 2184.

The lever 2186 also carries an aliner bar 2192, which is adapted to engage with the aliner notches 2193 formed in the lower edge of the slide so as to aline and hold the slide firmly in the position which it has assumed while it is being sensed by the feeling mechanism presently to be described.

After the slide 2182 has been differentially positioned, its position is then sensed by means of sensing lever 2259 pivotally mounted on a stud 2208 secured to the right side frame 215. The lever 2259 (Fig. 37) is urged counter-clockwise about said stud by a spring 2209, stretched between the lever and a bracket 2210 fastened ot the right side frame.

When the machine is at rest, the sensing lever is held in the position shown in Figure 37 by a stud 2211 engaging with a heel 2212 formed on the lower end of a depending arm of the sensing lever. The stud 2211 is mounted in the upper end of a follower arm 2213, which is pivotally mounted on the shaft 923 beside the follower arm 2189 and which carries at its lower end a roll 2214, which engages with the periphery of a plate cam 2215 secured to the main cam shaft 253. Hence, when the machine is put through a cycle of operation, the follower arm will be rocked clockwise, so as to release the sensing lever 2259 to the pull of the spring 2209 and thereby cause a sensing finger 2258, formed on the left-hand end of the lever, to sense a notch 2257, formed in the rear end of the slide 2182.

The lever 2259 (Figure 37) has a rearwardly-extending arm, to which is connected the upper end of a wire link 260, the lower end of which is pivotally connected to an arm 2261, freely pivoted on the carriage throat shaft 1673. This arm is provided with a forwardly-extending finger 2262, which overlies the pin 1671 (see also Figure 38) carried by the arm 1670, which is secured to the paper feed tube 1669. Hence, if the paper feed slide is moved to such a position as to enable the sensing finger to enter the notch 2257, the link 2260 will be elevated, thereby causing the finger 2262 to depress the pin 1671 and rock the tube 1669 in a counter-clockwise direction, so as to cause the paper feed clutch (Figures 25 and 26) to be engaged and a line-spacing operation of the carriage platen to result.

This slide 2182 may be controlled by the traveling paper carriage, there being provided for this purpose a control lever 2266 (Figure 37), which is pivotally mounted on the stud 2240 and is provided with a stop finger 2267, which is adapted to engage a shoulder 2268 formed on the upper edge of the slide. The rear end of the lever 2266 is pivotally connected to the lower end of a link 2269, the upper end of which is pivotally connected to the right-hand end of the sensing arm 1935 (Figures 27 and 29). As schematically illustrated in Figures 35A and 35B, whenever an "S" or a "T" length control plate 1405 is present in the carriage stop, the lever 2266 will be positioned so as to engage the shoulder 2268 and stop the slide 2182 after the latter has moved forwardly one step in the machine. This will place the notch 2257 beneath the sensing finger 2258 and thereby cause a paper feeding operation to take place. However, if an "A" length control plate or no control plate at all is present in the stop, the control lever 2266 will be elevated to a position where the finger 2267 lies above the shoulder 2268, and the slide will therefore be permitted to move two steps forward, so as to place a high portion of the slide beneath the finger 2258 and thereby prevent a paper feeding operation.

The carriage throat slide 2183, illustrated in Figure 39, is operated in the same manner as the previously-described slide 2182 and is provided at its rear end with a shoulder 2270, which is adapted to be engaged by a sensing finger 2271 formed on the forward end of a sensing lever 2272 pivotally mounted on the stud 2208, the lever 2272 being controlled in its sensing movements by the stud 2211 provided in the upper end of the arm 2213. The lever 2272 has a rearward extension formed thereon, to which is pivotally connected the upper end of the wire link 1788, which, when pulled upwardly, will cause the carriage throat shaft 1673 to be rocked counterclockwise and thereby cause the carriage throat clutch, shown in Figures 31 and 32, to be engaged and so cause the front feed throat mechanism to be operated.

As in the case of the slide 2182, the carriage throat slide 2183 may be controlled from the traveling paper carriage so as to render the performance of this function entirely automatic. For this purpose, the slide is provided with a shoulder 2276, which is adapted to cooperate with a stop finger 2277 formed on the forward end of a control lever 2278 pivotally mounted on the stud 2240. The rear end of the control lever is pivotally connected to the lower end of a link 2279, the upper end of which is pivotaly connected to the link 2269 (see also Figures 27, 29 and 37). As illustrated in Figures 36 and 39, when a "T" length control plate is present in the carriage stop, the stop finger 2277 will engage the shoulder 2276 and prevent forward movement of the slide, thereby preventing operation of the carriage throat mechanism. However, when an "A" or an "S" length control plate is present, the stop finger will be elevated above the shoulder, and the slide will be free to move forward in the machine so as to place the shoulder 2270 beneath the sensing finger 2271 and thus cause the carriage throat clutch to ben engaged. If no control plate is present to limit the upward movement of the sensing finger 1889, the control lever 2278 will be rotated to its full extent, so as to bring a lug 2280, formed on the rear end of the lever, directly in front of a shoulder 2281 formed on the slide 2183, so as to block forward movement of the slide and prevent an operation of the carriage throat mechanism.

It will be observed that the control lever 2278 for the carriage throat slide and the control lever 2266 for the paper feed slide are both connected to the same link 2269 and are therefore both controlled by the same sensing finger 1889; namely, the finger in the #16 position (Figure 27). Hence, when an "A" length control plate is present in the carriage stop, the throat mechanism will be rendered operative, while the paper feed mechanism will be blocked against operation. When an "S" length control plate is present, both the carriage throat mechanism and the paper feed mechanism will be rendered operative. When a "T" length control plate is present in the carriage stop, the paper feed mechanism will be rendered operative, while the carriage throat mechanism will be blocked. Hence, by selecting the proper length of control plate, either or both functions may be rendered effective.

The paper feed slide 2182 (Figure 37) and the throat slide 2183 may be controlled in their forward movements by any or all of the motor bars 2050, 2051 and 2052 (Figures 43 and 44) in a manner not shown or further described and of minor concern here, to control the paper-feed and throat opening functions of the traveling carriage.

Ribbon shifting mechanism

The accounting machine described herein is provided with a single ink ribbon 2600 (Figures 40 and 43) for both the accounting machine and the typewriter, which lies between the type elements of these mechanisms and the record material supported by the platen (Figure 1), so as to cause ink impressions to be made on the record material when the type elements are driven thereagainst. The ribbon is provided with two color fields, the upper field being impregnated with black ink, while the lower field is impregnated with red ink, means being provided, as will be described hereinafter, for elevating the ribbon when it is desired to print items in red. The ribbon is also normally held away from the platen so as to facilitate the reading of the items printed thereon and is moved toward the platen when an imprint is to be made on the record material. The ribbon extends transversely across the machine and is supported at either end on conventional ribbon spools situated within the ribbon boxes 2601 (Figure 43).

The detailed construction of the ink ribbon mechanism is shown in Figures 40 to 42 inclusive, from which it will be noted that the ribbon is supported on either side of the adding machine type sectors 942 (Figures 1 and 43) by means of a pair of ribbon guides 2602 supported on the upper ends of arms 2603 (Figure 42). Each arm is provided with an elongated slot 2604 cooperating with a stud 2599 mounted in the side plates of the printing mechanism, while the lower ends of the arms are guided by means of studs 2605 secured thereto, which cooperate with curved slots 2606 formed in the printer side plates. Engaging with each stud 2605 is the bifurcated end of an arm 2607 secured to a shaft 2608, which is journaled between the printer side frames. Also secured to the shaft, just inside the right printer side frame, is an operating arm 2609, which is urged clockwise by means of a spring 2610, which is stretched between the arm and a stud on the yoke 964. The arm is prevented from rotating under the influence of the spring by means of a stud 2611 mounted on the yoke, which stud bears against a curved edge formed on the arm 2609. When the yoke 964 is first moved toward the rear of the machine during an operation thereof, the stud 2611 will move away from the arm 2609 and permit the latter to be rotated clockwise by the spring 2610, so as to rock the shaft 2608 and cause the arms 2607 to elevate the arms 2603 and the ink ribbon. When the yoke is returned to its initial position, as shown in Figure 42, the stud 2611 therein will contact the edge of the operating arm and restore this arm and the ink ribbon supporting arms 2603 to their home positions, where the ink ribbon is held down and away from the platen 539. It will be noted that the lower portion of the slot 2606 is cut at an angle to thereby cause the upper ends of the arms 2603 to rock toward the platen as they are lifted upwardly to thereby move the ribbon into printing position in readiness for an operation of the type sectors 942. It is further to be noted that the upper portion of the slot 2606 is substantially vertical, so that, after the stud 2605 reaches this portion of the slot, the arm 2603 will be carried upwardly without any further rocking motion, thereby causing the red field of the ribbon to be interposed between the type sectors and the record material.

Whether the item is to be printed in black or in red depends, therefore, upon whether the stud 2605 is stopped before it enters the upper portion of the slot or whether it is permitted to move clear to the upper end of the latter. This is determined by means of a blocking arm 2612 (Figure 40) provided with a hook 2613, which is adapted to engage with a tooth 2614 formed on the operating arm 2609. The blocking arm 2612 may be controlled in various ways; however, as the manner in which this arm is controlled is not pertinent to the present invention, it is believed unnecessary to describe a mechanism for effecting such controlling. It is believed sufficient to say that, if the hook is free to move into the path of the tooth 2614 on the operating arm 2609, it will thus prevent the stud 2605 from moving into the upper portion of the slot 2606. Hence, the black field of the ribbon will be presented to the printing type, and a black impression will be made on the record material. However, if the arm 2612 is held in its lower or ineffective position, this will permit the operating arm to receive its full movement and thereby cause the ribbon to be elevated to a point where its red field will be located at the printing line.

The ink ribbon 2600 is supported in the typewriter printing position by means of a ribbon guide 2627, which is mounted on a stem 2628 (Figure 41), which is rigidly secured to the upper end of a ribbon arm 2629. This arm is pivotally supported at 2630 on the forward edge of a plate 2631, the rear edge of which is secured to a shaft 2632, journaled in ears formed on brackets 2633 (Figure 40), which are secured to the rail 217. The arm 2629 is provided at its lower end with a stud 2634, which is adapted to engage with a bifurcation provided in the upper end of a lever 2635 journaled on the rod 524 (Figure 7). The lever 2635 is urged clockwise by means of the spring 1305, which is stretched between the lower end of the lever and a stud on the link 1306, movement of the lever in this direction being limited by engagement of the universal bar 1299 with the lips 1298 formed on the levers 516 (see Figure 7). Therefore, when a typewriter key 444 is depressed, the universal bar 1299 and the lever 1304 will be moved counter-clockwise or downward so as to cause the lever 2635 to be rocked counter-clockwise and the ribbon guide 2627 moved toward the platen until a projection thereon (not shown) engages with the type guide 538 to thereby limit the movement of the ribbon guide in this direction. After the ribbon guide has thus been stopped, continued movement of the universal bar 1299 will cause a spring 2637, extending from the link 1306 to a stud on the universal lever 1304, to be stretched, the stud 1307 moving into the rear end of the slot of the universal lever at this time. When the universal bar is released, the spring 2637 will return the stud 1307 to the forward end of the slot, after which the lever 2635 will be rocked clockwise so as to return the ribbon guide 2627 into the position shown in Figure 41. The purpose of the stud-and-slot connection 1307 is to cause the ribbon guide to be moved quickly into printing position, after which it will remain at rest while the universal bar continues its downward movement, thereby insuring that the ribbon will be in printing position before the type levers strike thereagainst.

Red and black printing of the typewriter as well as of the accounting machine may be controlled by means of a ribbon lever 2638 (Figure 40) pivotally mounted on a stud 2639 secured to the left side frame, the lever being movable to any one of three positions which are indicated on the keyboard cover plate as "Stay Red," "Normal," and "Restore." The lever is connected to the forward end of a link 2640, the rear end of which is pivotally connected to a stepped plate 2641, which is pivotally mounted on a stud 2642 secured to the left side frame 214. The plate is provided with three stepped surfaces consisting of a low center step and a high step on either side thereof. These steps cooperate with a roll 2643 mounted on the end of the pitman 2644, which is slotter so as to fit over the stud 2642. The roll 2643 is urged into engagement with the stepped surfaces by means of a spring 2650 (Figure 41) stretched between the stud supporting the roll and the frame stud 2642. The rear end of the pitman is bifurcated and receives a stud 2651 mounted on the lower end of an arm 2652 secured to the left-hand end of the shaft 2632. The stud 2651 is urged into engagement with the bifurcation by means of a spring 2653, which is stretched between the arm 2652 and a stud 2654 (Figure 41) mounted in the pitman. It will thus be seen that, when the ribbon lever is moved from its normal position to either the "Stay Red" or the "Restore" positions, the high steps on the plate 2641 will cause the pitman to be moved forwardly against the urgency of the spring 2650. The arm 2652 will thereby be rocked clockwise, as viewed in Figure 40, so as to similarly rotate the shaft 2632 and the plate 2631 and cause the typewriter ribbon guide to be elevated so as to move the red field on the ribbon into printing position. When the guide and the arm 2629 are thus elevated, the stud 2634 will move to the upper end of the bifurcation in the lever 2635 but will not move out of engagement therewith. Hence, the operative connection between the universal bar and the ribbon will remain intact, and the ribbon will be moved up to the platen each time a typewriter key is struck.

The accounting machine ribbon guides 2062 may likewise be controlled for printing in red whenever the ribbon lever is moved to either its "Stay Red" or "Restore" positions. It will be noted that a small manipulative lever 2655 (Figures 41 and 43) is pivotally mounted on the stud 2654 by means of an elongated aperture formed in the lever. A stud 2656 is mounted on the lower end of the lever and is connected by a spring 2657 with the stud 2654 so as to urge the lever upwardly. The stud 2656 is adapted to cooperate with either one of two notches formed on the lower edge of the pitman so as to define a "Normal" and a "Black" position of this lever as indicated in Figure 41. A formed-over ear 2658 is provided on the bottom of the lever 2655, which ear is adapted to cooperate with the nose 2659 formed on an arm 2660 secured to the shaft 2615. Hence, when the lever is in its normal position and the pitman is moved toward the front of the machine, the ear will move over the nose 2659 so as block clockwise rotation of the arm 2660 and the shaft 2615. Thus, the hook 2613 (Figure 40) will be prevented from engaging the projection 2614 on the operating arm, and the latter will receive its full movement, so as to carry the arms 2603 up to the red ribbon position. However, if the lever 2655 is moved to its black position, the ear 2658 formed thereon will not move over the nose 2659 when the pitman moves forwardly, so that the shaft 2615 will not be blocked against operation and the hook 2613 may engage with the projection formed on the operating arm, so as to stop the ribbon when its black field is positioned at the printing line.

When the ribbon lever 2638 is moved to the "Restore" position, the plate 2641 will be rocked clockwise, so as to lower a hook 2661, pivotally mounted thereon, into engagement with a tooth 2662 formed on the arm 917. Hence, when the latter arm is restored to its home position during the last half of the machine cycle, the tooth formed thereon will engage the hook 2661 and return the plate and the ribbon level to their normal positions, as shown in Figure 40. When the lever is moved to its "Stay Red" position, however, the hook 2661 will be elevated above the path of the tooth 2662, and the lever will be permitted to remain in this position until it is returned manually by the operator.

In order to prevent interference between the typewriter ribbon guide 2627 and the front feed chute 1829 (Figures 8 and 10) when the carriage throat is opened, means is provided for restoring the ribbon guide 2627 to its black printing position simultaneously with the opening of the throat. As shown in Figure 11, the arm 1800 has secured thereto an adjustable eccentric 2663, which, when the throat mechanism is open, is adapted to engage with a finger 2664 secured to the lower end of a sleeve 2665 (see also Figure 41), which is rotatably mounted on a stud 2666 secured to the bracket 348. Secured to the upper end of the sleeve is an arm 2667, to which is pivotally secured a slide element 2668, which is received within a notch cut in the top edge of the rail 217. The slide element has provided therein an aperture 2669, which cooperates with a finger 2670 (Figure 41) pinned to the shaft 2632. Hence, when the throat is opened, the eccentric will engage the finger 2664, so as to pull the element 2668 toward the rear of the machine, thereby rocking the shaft 2632 and restoring the ribbon guide 2627 to its lower or black position while stretching the spring 2653. Thus, when the carriage throat is in its open position, the ribbon guide will be held down so as not to rub against the chute 1829, which moves forwardly and downwardly when the throat is opened. When the throat mechanism is closed, the eccentric will move away from the finger 2664 and allow the spring 2653 to restore the ribbon guide 2627 to its upper or red position.

*Example of work*

In order to provide a better understanding of the functioning of the machine as a whole, a typical accounting problem will be described in connection with the accounts payable form illustrated in Figure 50 of the drawings. The method for handling accounts payable, to be described hereinafter, is typical of the methods used by the larger department stores, which are organized on the basis of a large number of closely integrated but financially independent departments. The system shown herein consists of a department journal sheet 1858, which is held in position on the platen of the carriage by means of the upper and lower compression rolls 1882 and 1866, as shown in Figure 12, and a vendor's ledger card 1850 (Figures 8 and 9), which is located in front of the journal sheet and held in position by means of the forward compression rolls 1826.

Supposing, for example, that it is desired to post the acounts payable for the Chinawares Department of the A. B. C. Department Store for the month of January. In this case, the journal sheet 1858 for the Chinawares Department is placed in the machine, as shown in Figure 43, and the ledger card of a vendor of goods to this department is placed in the machine in front of the journal sheet, with a piece of carbon paper in between. Then the carriage is returned to the #1 column, if it is not already in this position, by depression of the proper "Reverse Tab" key 1583. The previous balance of the vendor's account is found in column #10 of the ledger card and will be the last item posted in this column. As shown in Figure 50, in the case of the vendor, John E. Smith Company, this amount is $300.00, this amount being set up on the keyboard of the accounting machine and the motor bar depressed so as to cause this amount to be printed in column #1 of the journal sheet and added into the #1 totalizer of the machine. At the conclusion of this operation, the traveling carriage tabulates automatically to column #2.

Next to be posted is the information taken from the invoice for a particular shipment of goods by John E. Smith Company to the Chinawares Department of the A. B. C. Department Store. The first entry taken from the invoice is made in column #2 of the journal and represents the retail selling price of the goods carried on the invoice. This amount—namely, $200.00—is set up on the keyboard of the machine and the motor bar is depressed so as to cause the amount to be printed and also entered into the #7 totalizer of the machine, so as to provide a total of the retail value of the merchandise bought by the Chinawares Department.

At the end of the machine cycle in column #2, the carriage tabulates to column #3, where it is stopped by the #1 or normal tab stop ready for printing the markup of the goods. Since the markup on this particular shipment of goods is 100%, the operator sets up 100.00 on the keyboard of the machine and presses the motor bar, thereby causing the "100" to be printed in column #3. It will be noted that printing in the units and tens of cents places is suppressed, this being controlled from the carriage stops.

At the end of this cycle, the carriage tabulates to the #4 column, where it is stopped by a normal tab stop so as to enable the receiving entry number (5701) appearing on the invoice to be printed on the journal sheet. Here again, the printing of amounts in the units and tens of cents orders is suppressed by the control exercised by the carriage stop for this column. The operations in columns #3 and #4 are purely printed operations, and no totalizer is selected to receive the entry in either of these columns.

The carriage then tabulates into the #5 column, where it is stopped by a #3 or hold-skip stop. The presence of this stop in the #5 column makes it possible for the operator of the machine to tabulate the carriage directly to this column from any one of the preceding columns by merely depressing and holding down the skip tab motor bar, which causes the tabulating stop arm 1426 (Fig. 47) to be set to its first position, where it will cooperate with only the #3 stop and not with the #1 stops, which are present on the carriage stops in columns #2, #3 and #4. In the #5 column, the date, January 2, is set up on the date keys, and the amount of the goods listed on the invoice ($100.00) is set up on the amount keys, after which the motor bar is depressed so as to cause the date and the amount to be printed in column #5 and the amount of the invoice to be added into totalizers #1 and #3. The control of date printing and of totalizer selection is effected by the use of the proper control plates in the stop for this column.

At the end of the cycle, the carriage tabulates into column #6, where it is stopped by the #1 tab stop, which is present in this column. The class of the goods and the rate of the discount are printed in a single operation in two separate columns, this being effected by means of the split provided in the printing mechanism between the fifth and sixth orders and also by means of the non-printing control for suppressing printing in the units and tens of cents orders, as described in connection with columns #3 and #4. The split in the printing mechanism and the non-printing of the units and tens of cents orders are both controlled from the carriage stop located in this column.

The carriage then tabulates into column #7, where it is stopped by a #1 or normal tab stop, and the amount of the discount, in this instance $2.00, is set up on the amount keys and the motor bar is depressed to cause the amount of the discount to be subtracted from the #1 totalizer and added into the #4 totalizer. Since this is a subtractive entry in the #1 totalizer, the amount is printed in red. At the end of the cycle, the carriage tabulates into the #8 column, where it is stopped by a #2 stop.

The amount of the anticipation discount—namely (50¢) is then set up on the keyboard and the motor bar is depressed so as to cause this amount to be subtracted from the #1 totalizer and added into the #5 totalizer. Here again, the amount is printed in red, since it is a subtractive entry in the #1 totalizer. The carriage then tabulates into the #9 column, where it is stopped by a #2 tab stop, and the amount of the freight or express charges ($1.35) is set up on the keyboard and the motor bar depressed so as to cause this amount to be subtracted from the #1 totalizer, added into the #6 totalizer and printed in red upon the record material.

Since there is another invoice to be entered on the journal sheet and on the ledger card of John Smith & Company, it is desirable to return the carriage to the #2 column at the conclusion of the operation in the #9 column. This return may be effected by the operator when the amount ($1.35) is entered in the Freight and Express column (9) by holding the motor bar depressed with the motor bar control lever in the #1 position.

The retail value of the goods on the second invoice is $75.00, and this amount is entered in column #2, after which the carriage is tabulated to column #3, where the markup of 50% is entered. In column #4, the receiving entry number 5,689 is entered, and the carriage then tabulates to column #5, where the date and the amount of the invoice are printed and the amount entered in the #1 and #3 totalizers, as described above. The carriage then tabulates into the #6 column, where the number designating the class of goods is printed by means of the split feature described earlier herein. Since there are no discount or anticipation entries to be made in columns #7 and #8, it is desirable that these columns be skipped and the carriage stopped in the #9 column. This operation may be effected by use of the skip motor bar to enter the class of goods in column #6 and then holding this bar depressed so as to cause the carriage to skip those columns in which #1 and #2 tab stops are provided. However, the carriage may be stopped in the #9 column by releasing the skip bar while the carriage is between the #8 and #9 columns, so that the tabulation stop arm will be permitted to rise into the path of the #2 stop and stop the carriage in the #9 column.

After entering the amount of the freight (75¢) to be paid by the vendor, the motor bar is depressed so as to cause the carriage to tabulate into column #10, where it is stopped by a #3 tab stop. The carriage stop in the #10 column is also provided with an automatic cycling lug for causing the machine to be automatically cycled in this column. The stop is also provided with control plates which select the #1 totalizer for a total-taking operation and the #2 totalizer for an adding operation. Accordingly, when the carriage tabulates into the #10 column, the machine will cycle automatically and will print and clear the total of the amount representing the net balance due to John Smith & Company from the #1 totalizer and cause this amount to be added into the #2 totalizer, so as to provide a total of all accounts payable.

The carriage then tabulates into column #11, where the rate of the loaded discount (20%) is printed, the printing of zeros in the tens and units of cents orders being eliminated in this instance. Near the end of the operation in this column, the carriage is released for movement to the #12 column, where it is stopped by a #1 tab stop and the amount of the discount ($10.00) is set up on the amount keys and the motor bar is depressed so as to cause this amount to be printed on the journal sheet and entered into the #8 totalizer.

The carriage then tabulates into column #14, where it is stopped by a #3 tab stop, and the voucher number 6798 is set up on the keyboard and printed in this column, with the tens and units of cents orders non-printed under control of the carriage stop. The carriage then tabulates into column #15, where no entry is made, since the freight was charged to the vendor. However, the arrangement of columns #13, #14 and #15 of the journal sheet is such that, when the carriage is located in the last or #15 column, as determined by the #3 tab stop, the journal sheet will be in proper relation with respect to the typewriter mechanism to permit the operator to commence typing the name of the vendor at the left margin of column #13. Accordingly, the words "John Smith and Company" are typed in column #13 by use of the electric typewriter, and, if a second line of typing is needed in this column, such as the address of the company, the carriage may be returned from the right margin of column #13 to the left margin thereof by operation of the proper "Reverse Tab" key on the typewriter keyboard, and line spacing of the form may be effected by locating the slide 1747 (Figure 6) on this key in its effective position. Operation of the "Reverse Tab" key will cause the carriage to be returned to a position where the left side of column #13 will again be in typewriter printing position. After the typing in column #13 has been completed, the carriage may be returned to column #1 by operation of the proper "Reverse Tab" key 1583. While the carriage is being returned to column #1, in the manner mentioned above, the carriage throat may be opened by means of the key 1781 (Figures 43 and 44), located on the right-hand side of the adding machine keyboard, and the ledger card for John Smith and Company may then be removed from the carriage.

The third invoice to be posted is one from Thomas Brown and Sons, and, accordingly, the ledger card for this company is now inserted around the platen through the open front-feed throat. After the card has been positioned therein, the throat is closed by again depressing the carriage throat control key. The previous balance ($135.00) on the ledger card is picked up and entered in the first column of the journal sheet and added into the #1 totalizer, after which the carriage tabulates to the #2 column. Here, the retail value of the goods ($150.00) is entered, after which the mark-up, the receiving entry number, the date, and the amount of the invoice are printed in columns #3, #4 and #5, respectively. The class of goods and the rate of discount are next printed in column #6, after which the dollar amount of the discount and also of the anticipation are entered in columns #7 and #8. Since there is no entry to be made in column #9, the operator enters the anticipation in column #8 by using the skip tab motor bar and, by holding this motor bar depressed, causes the carriage to skip the #9 column and tabulate directly to the #10 column. Here, the machine cycles automatically, so as to cause the total in the #1 totalizer to be taken and printed on the ledger and journal.

Next, the rate of the loaded discount is printed in column #11 of the journal sheet, after which the carriage tabulates into column #12, where the amount of the loaded discount is printed and added into totalizer #8. The carriage then moves into column #14, where the voucher number is printed, and then into column #15, where the freight charge ($1.45) is printed on the journal sheet and also added into the #9 totalizer by means of a suitable control plate in the column #15 stop. The carriage is prevented from tabulating out of this column by the presence of an S-length control plate in the #13 position, which disables tabulation. The carriage thus remains in position for the typing of the name of the vendor in column #13, as explained above. After the typing has been accomplished, the carriage is returned to column #1 by operation of the proper "Reverse Tab" key.

The fourth and last set of entries on the record forms illustrated in Figure 50, are similar to the other entries explained above, only these entries are for the purpose of illustrating the use of the reverse feature of the machine in maintaining the correct balances of the accounts kept in the various totalizers of the machine, such accounts involving, for example, items returned for credit. Likewise the reverse feature may be used in correcting erroneous entries.

The reverse feature includes a "Reverse" key depression of which controls mechanism which causes the totalizers selected for addition to be reversed and perform instead subtract operations, and causes the totalizers selected for subtraction to be reversed and perform instead adding operations.

After the accounts payable have been posted to the Chinawares Department of the A. B. C. Department Store, the departmental journal sheet may be removed from the carriage and the journal sheet of another department of the store placed therein preparatory to posting the accounts payable for this department. Before the departmental journal sheet is thus removed from the carriage, the various totalizers in which the different types of entries were stored may be totaled or sub-totaled in their respective columns of the journal sheet, so as to record the totals of these items.

While the form of mechanism herein shown and described is admirably adapted to fulfill the objects primarily stated, it is to be understood that it is not intended that the invention shall be confined to the particular embodiment disclosed herein but rather that it shall extend to all structures employing the principles taught herein.

What is claimed is:

1. In a machine of the class described, having a main operating mechanism, continuously operating power means for giving said main operating mechanism cycles of operation, a printing mechanism, and a paper carriage including a platen, the combination of a front-feed chute for directing the lower edge of a record card around said platen from the front of the carriage; means for moving said chute from a front-feed position to a printing position and vice versa; and manually controlled means for selectively connecting said moving means with said power means either during cycling of the main operating mechanism or when said main operating mechanism is at rest so as to cause said chute to be moved from printing position to front-feeding position.

2. In a machine of the class described having a main operating mechanism, a continuously operating power means for giving said main operating mechanism cycles of operation, a printing mechanism, and a traveling paper carriage including a platen, said traveling carriage movable to various columnar positions, the combination of a front-feed chute for directing the lower edge of a record card around the front face of said platen, said card being inserted from the front of the machine; means for moving said chute from a front-feed position to a printing position, and vice versa; normally ineffective means for operably connecting said moving means with said continuously operating power means; and means controlled by the traveling carriage in predetermined columnar positions thereof and operated by the main operating mechanism for rendering said normally ineffective means effective to connect said moving means with said power means in any columnar position of said carriage so as to cause said chute to be moved from its front-feed position to its printing position, or vice versa.

3. In a machine of the class described having a printing mechanism, a traveling paper carriage, and a platen on said carriage which is at all times located in printing position relative to said printing mechanism, the combination of a front-feed chute on said carriage which is movable from a lower or open-throat position, in which it is spaced away from said platen, to an upper or closed-throat position, in which it is located adjacent to said platen, said chute serving, when in open-throat position, as a guide for directing a front-fed work sheet around said platen; power means connected with said chute for moving the latter from its open-throat position to its closed-throat position; and means for enabling said chute to be manually moved from either of its aforesaid positions to a third position, where it will serve to indicate the line upon which printing will occur.

4. In a machine of the class described, having a printing mechanism, a traveling paper carriage, and a platen on said carriage which is at all times located in printing position thereon with respect to said printing mechanism, the combination of a front-feed chute on said carriage which is movable from an upper or closed-throat position, where it lies adjacent to said platen, to a lower or open-throat position, where it lies away from said platen, or to a third position, where it serves to indicate the line upon which printing will occur on record material wound around said platen; a power means for moving said chute from its lower or open-throat position to its upper or closed-throat position; and a yieldable connection between said power means and said front-feed chute for enabling said chute to be manually moved against the urgency of said yieldable connection from its upper or closed-throat position to said third position, where it will serve to indicate the printing line.

5. In a machine of the class described having a main operating mechanism, a continuously-operating power drive for giving said main operating mechanism cycles of operation, a printing mechanism, a traveling paper carriage movable back and forth across the machine to various preselected columnar positions, and a platen mounted on said carriage in such a manner as to at all times be located in printing position with respect to said printing mechanism, the combination of means cooperating with said platen for receiving and holding a record card in front-fed position, said means being movable from an open-throat position to a closed-throat position, and vice versa; means for moving said receiving and holding means from said open-throat position to said closed-throat position, and vice versa; normally ineffective means for connecting said power drive with said moving means so as to cause operation of said receiving and holding means; and means controlled by the traveling carriage in preselected columnar positions thereof and operated by the main operating mechanism during cycles of operation for rendering said normally ineffective means effective to cause said receiving and holding means to be moved from its open-throat position to its closed-throat position, or vice versa.

6. In a calculating machine of the class described, having a printing mechanism, a main operating mechanism for the calculating mechanism of the machine, and a motor drive mechanism for giving the main operating mechanism cycles of operation, the combination of a platen for supporting record material, said platen being at all times located in printing position with respect to said printing mechanism; a columnar printing control means for enabling printing on the record material to be effected in a plurality of different columns; a front feed mechanism cooperating with said platen for receiving and holding the record material in front-fed position relative to said platen, said mechanism being movable from an open-throat position to a closed-throat position and vice versa; normally ineffective means for connecting said front-feeding mechanism with said motor drive mechanism so as to cause said front-feeding mechanism to be moved from one position to another; and means including a control slide positioned by said columnar printing control means, and sensing means co-acting with said slide for rendering said normally ineffective means effective when printing is effected in preselected columns of the record material to thereby cause movement of said front-feeding mechanism from one position to another.

7. In a machine of the class described having a printing mechanism, a traveling paper carriage movable horizontally to various columnar positions, and means for controlling the movement of said carriage from one columnar position to another, the combination of a platen mounted on said carriage so as to be at all times in printing position with respect to said printing mechanism; front-feed means for enabling a work sheet to be front-fed into said carriage and for holding said work sheet in front-fed position, said front-feed means being movable from an open-throat position to a closed-throat position and vice versa; a bail mounted on said carriage and extending approximately the full length thereof, said bail being operatively connected with said front-feed means so as to be effective to move the same from open-throat to closed-throat position or vice versa in any horizontal position of said carriage; power means; and means including a positionable slide controlled by the traveling paper carriage in preselected columnar positions thereof, and a sensing mechanism coacting with said slide for connecting said power means with said bail so as to cause the bail to be operated and the front-feed means to be moved from its open-throat position to its closed-throat position or vice versa.

8. In a machine of the class described having a traveling paper carriage and a rotatable platen mounted thereon on a fixed horizontal axis, the combination of a front-feed mechanism cooperating with said platen and movable with respect thereto for enabling a sheet of record material to be front-fed into the carriage, said mechanism having an open-throat position for receiving the sheet of record material and a closed-throat position for holding the sheet of record material in place within the carriage; normally disconnected operating means for causing said front-feed mechanism to be moved from one position to the other; means for controlling the columnar positioning of said carriage; and means including a control slide positioned by the traveling carriage in predetermined columnar positions thereof, and means controlled by the slide to connect the operating means to the front-feed mechanism to cause said operating means to move said front-feed mechanism from its open-throat position to its closed-throat position, or vice versa.

9. In a machine of the class described, having a printing mechanism, a traveling paper carriage, and a stationary platen mounted on said paper carriage, which is at all times located in printing position with respect to said printing mechanism, the combination of a front-feed mechanism cooperating with said platen and movable relatively thereto for enabling a sheet of record material to be front-fed into the carriage, said mechanism having an open-throat position for receiving the sheet of record material and a closed-throat position for retaining the record material in printing position with respect to said printing mechanism; means connected with said front-feed mechanism for enabling said mechanism to be moved from its open-throat position to its closed-throat position and vice versa; normally disconnected means for operating the enabling means; means including a positionable slide and a sensing device coacting therewith, for connecting the operating means to the enabling means; means for controlling the columnar positioning of said carriage so as to enable impressions to be made in various columns on the record material by the printing mechanism; and means rendered effective by said carriage when it is positioned for printing in certain columns thereof for controlling the positioning of the slide for causing said operating means to operate the enabling means to move said front-feed mechanism from its open-throat or sheet-receiving position to its closed-throat or sheet-retaining position, or vice versa.

10. In a machine of the class described having a traveling paper carriage and a platen mounted on a fixed horizontal axis thereon, the combination of a front-feed mechanism cooperating with said platen and movable relatively thereto for enabling a sheet of record material to be front-fed into the carriage, said mechanism having an open-throat position for receiving the sheet of record material and a closed-throat position for holding the record material in place within the carriage; a main operating mechanism; a control slide operable by the main operating mechanism and positionable under control of the traveling carriage; and a sensing mechanism operated by the main operating mechanism and coacting with the control slide for causing said front-feed mechanism to be moved from its open-throat position to its closed-throat position, or vice versa.

11. In a machine of the class described, having a traveling paper carriage and a stationary platen mounted thereon on a fixed horizontal axis, the combination of a front-feed mechanism cooperating with said platen and movable relatively thereto for enabling a sheet of record material to be front-fed into the carriage, said mechanism having an open-throat position for receiving a sheet of record material and a closed-throat position for holding a sheet of record material in place within the carriage; a main operating mechanism; means normally disconnected from said main operating mechanism but connectable therewith for controlling the operation of said front-feed mechanism; means including a positionable slide, to selectively connect the controlling means to the main operating mechanism; and means controlled by the traveling carriage to control the positioning of the slide to selectively control the movement of the front feed mechanism to open and closed throat positions.

12. In a machine of the class described, having a main operating mechanism, an electric motor for giving said main operating mechanism cycles of operation, a printing mechanism, a traveling paper carriage, and a rotatable platen mounted on said traveling paper carriage, said platen being at all times located in printing position with respect to said printing mechanism, the combination of means on said carriage for receiving and holding a record card in front-fed position on said platen, said last-named means being movable from a closed-throat position to an open-throat position and vice versa; normally ineffective driving connections from said motor to said receiving and holding means; and means comprising a slide positioned under control of said traveling paper carriage and a sensing device coacting therewith for rendering said driving connections effective to thereby cause said receiving and holding means to be moved from its closed-throat position to its open-throat position, or vice versa.

13. In a machine of the class described having a main operating mechanism, power drive means for giving said main operating mechanism cycles of operation, a printing mechanism, a traveling paper carriage, a platen mounted on said carriage for supporting record material, said platen being at all times located in printing position with respect to said printing mechanism, and means for controlling the columnar positioning of said carriage, the combination of a front-feed mechanism on said carriage for enabling record material to be front-fed into the carriage, said mechanism being movable from an open-throat position for receiving the record material to a closed-throat position for holding the record material in place on said platen; normally ineffective means for connecting said power drive means with said front-feed mechanism to thereby cause movement of the latter mechanism from its open-throat position to its closed-throat position and vice versa; and means comprising a slide positionable under control of said traveling paper carriage and a sensing device coacting therewith for causing said connecting means to be rendered effective when the main operating mechanism is given a cycle of operation with the traveling carriage located in a predetermined columnar position to thereby cause said front-feed mechanism to be moved to either its open-throat position or its closed-throat position during the cycle of operation of the main operating mechanism.

14. In a machine of the class described having a main operating mechanism, a continuously-operating power means for giving said main operating mechanism cycles of operation, a printing mechanism, and a platen for supporting a sheet of record material in continuous printing relationship with respect to said printing mechanism, the combination of means comprising a guide chute and pressure rollers cooperating with said platen for enabling a sheet of record material to be fed around the platen from the front of the machine and for holding the inserted material in printing position thereon, said chute and pressure rollers being movable from an open-throat position to a closed-throat position and vice versa; means including a pair of links for moving said pressure rollers from open-throat position to closed-throat position and vice versa; yieldable means to connect the links to the chute for normal concert operation, said yieldable means functioning to permit said chute to be moved independently of said links and the pressure rollers to a line-finding position, for adjusting the record material in relation to the printing mechanism; and means for selectively connecting said moving means with said power means for operation thereby so as to cause said throat to be opened or closed.

15. In a calculating machine of the class described having a printing mechanism, a traveling paper carriage movable to various columnar positions, and a platen mounted on said carriage, which is at all times located in printing position with respect to said printing mechanism, the combination of front-feed means comprising a guide chute and pressure rollers for enabling a work sheet to be front-fed into said carriage and for holding said work sheet in front-fed position, said front-feed means being movable from an open-throat position to a closed-throat position and vice versa; a bail mounted on said carriage and extending approximately the full width thereof, said bail being operatively connected with said front-feed means for moving it from an open-throat position to a closed-throat position or vice versa; a continuously operating power drive; normally ineffective selectively operable means for connecting said power drive with said bail in any columnar position of the carriage; and means including a control slide positionable by the traveling carriage in preselected columnar positions thereof and a sensing device coacting with said control slide to render the selectively operable means effective so as to cause the bail to be operated and said front-feed means to be moved to its open-throat position or to its closed-throat position.

16. In a machine of the class described, having a power means, a main operating mechanism, means for causing said power means to give said main operating mechanism cycles of operation, a printing mechanism, a platen for supporting record material in printing position with respect to said printing mechanism, and an ink ribbon interposed between said printing mechanism and said platen, the combination of front feed means for receiving a sheet of record material fed into the carriage from the front of the machine and for holding said sheet in position within said carriage during printing operations, said means including pressure rolls cooperating with said platen and a paper chute for directing the work sheet about said platen, said pressure rolls and said paper chute being movable from an open-throat position, wherein the pressure rolls and the paper chute lie away from the platen, to a closed-throat position, wherein these parts lie adjacent thereto, and a movable ribbon guide movable upwardly and rearwardly from a normal position, in which said ribbon is held away from said platen, to a printing position, wherein said ribbon is held in close proximity thereto; means for operatively connecting said pressure rolls and said paper chute with said power means so as to cause said rolls and said chute to be moved from one position to another; and means connected with said main operating mechanism and operable thereby on each cycle of machine operation for moving said ribbon guide upwardly and rearwardly from its normal position to its printing position prior to the operation of the printing mechanism and for moving said guide downwardly and forwardly back to its normal position after printing has been accomplished.

17. In a machine of the class described having a main operating mechanism, means for giving said main operating mechanism cycles of operation, a printing mechanism, a record material supporting device located adjacent to said printing mechanism, and an ink ribbon interposed between said printing mechanism and said supporting device, the combination of means for enabling a sheet of record material to be front-fed onto said supporting device and retained in position thereon during printing operations, said means including a movable ribbon guide; means to move the ribbon guide upwardly and rearwardly from a normal position, where said ribbon is held away from said supporting device; to a printing position, where said ribbon is held in close proximity thereto; and means connected with said main operating mechanism and operable thereby on each cycle of operation of the machine for actuating the moving means for moving said ribbon guide upwardly and rearwardly from its normal position to its printing position prior to the operation of said printing mechanism, and then moving said guide downwardly and forwardly back to its normal position after printing has been accomplished.

18. In a machine of the class described, having means for giving said machine cycles of operation, a printing mechanism, a record material supporting device located adjacent to said printing mechanism, and an ink ribbon interposed between said printing mechanism and said supporting device, said ribbon having a black printing field and a red printing field, the combination of a front-feed mechanism cooperating with said supporting device for receiving a front fed sheet of record material and for holding it in printing position on said supporting device, said means being movable from an open-throat position to a closed-throat position and vice versa; means for moving said front-feed means from its open-throat position to its closed-throat position and vice versa; a shiftable ribbon guide which is movable from one position wherein said black printing field is located in printing position to another position wherein said red printing field is located in printing position; means for shifting said ribbon guide from its black printing position to its red printing position; and means intermediate the moving means and said shifting means for preventing said ribbon guide from being moved to its red printing position when said front-feed means is in its open-throat position and also for causing said ribbon guide to be returned to its black printing position when said front-feed means is moved to its open-throat position with said ribbon guide in its red printing position.

19. In a machine of the class described, having a printing mechanism, a traveling paper carriage, including a frame, and a platen rotatably supported in said frame, the combination of means for receiving a work sheet fed into the carriage from the front of the machine, and for holding said work sheet in position within said carriage during operation of the printing mechanism, said means including pressure rolls cooperating with said platen, and a front-feed guide chute for directing the work sheet about said platen, and having an open-throat position wherein the pressure rolls and the chute are moved away from the platen, and a closed-throat position wherein these parts are moved adjacent to said platen; a continuously operating power drive; means including a pair of links to connect the pressure rolls to the power drive to cause the pressure rolls to be moved from open-throat to closed-throat position, and vice versa; yieldable means to connect the links to the front feed chute, whereby said chute will normally move in unison with said links from open-throat to closed-throat position and vice versa, but providing means whereby said chute may be moved independently of said links to a line-finding position; and means to guide the chute when moving independently of the links to line-finding position.

20. In a machine of the class described, having a main operating mechanism, power means for giving said main operating mechanism cycles of operations, a printing mechanism, and a traveling carriage, including a platen roll, the combination of a front-feed guide chute for directing the lower edge of a record card around said platen roll from the front thereof, said chute being movable from a front-feed position to a printing position, and vice versa; means for engaging and holding an inserted record card in printing position during an operation of said machine, said engaging and holding means being movable from a card-engaging position to a card-releasing position, and vice versa; means including a pair of links for moving the engaging means from card-releasing position to card-engaging position, and vice versa; yieldable means to connect the links to the chute for normal concert operation from front-feeding position to printing position, and vice versa, said yieldable means permitting said chute to be moved independently of the links and the moving means to a line-finding position; and means to guide the chute when moving independently of said links and said moving means to line-finding position.

21. In a machine of the class described, having a main operating mechanism, a continuously operating power means for giving said main operating mechanism cycles of operation, a platen for supporting pieces of record material, and a printing mechanism for printing information on said record material on a given printing line, the combination of a front-feed guide chute for directing the lower edge of a piece of record material around said platen when said material is fed in from the front thereof, said chute being movable from a front-feed position to a printing position and vice versa, and adapted to engage the inserted piece of record material above the printing line; retaining means for engaging a piece of inserted record material below the printing line and for holding said record material in printing position, said retaining means being movable from a record material engaging position to a record material releasing position, and vice versa; means including a pair of links for moving the record material retaining means from its releasing position to its engaging position, or vice versa; yieldable means for connecting the links to the chute; means separate from the main operating mechanism for selectively connecting the moving means to the power means for operation thereby so as to cause said retaining means and said chute to be normally moved in unison from one position to another, said yieldable means permitting said chute to be moved independently of said links and the retaining means to a line-finding position; and means for guiding the chute during its independent movement to line-finding position.

22. In a machine of the class described, having a main operating mechanism, a continuously operating power means for giving said main operating mechanism cycles of operation, a mechanism for printing information on a given printing line, and a platen so mounted with respect to said printing mechanism as to support a sheet of record material wound thereabout at all times in printing position with respect to said printing mechanism, the combination of a front-feed guide chute for directing the lower edge of a sheet of record material around said platen from the front thereof, said chute being movable from a front-feed position to printing position and vice versa, said chute also being adapted to engage the inserted record material above the printing line; a record material retaining means for engaging an inserted sheet of record material below the printing line and holding said sheet in printing position, said retaining means being movable from a record material engaging position to a record material releasing position, and vice versa; means including a pair of links for moving said record material retaining means from releasing position to engaging position, or vice versa; yieldable means for connecting the links to the chute to cause said moving means to move said chute from its front-feed position to its printing position, or vice versa; normally ineffective means for operatively connecting said moving means with said continuously operating power means for operation thereby; and manipulative means for rendering said normally ineffective means effective to cause said moving means to be connected with said power means to thereby cause said record material retaining means and said chute to be moved in unison from one position to another, said yieldable means permitting said chute to be moved independently of the links and the record material retaining means to a line-finding position.

23. In a machine of the class described, having a printing mechanism, a main operating means for operating the machine, and a power means for driving said main operating means, the combination of a platen which is at all times located in printing position with respect to the printing means; a front-feed mechanism, including a front-feed guide chute, and retaining means for guiding record material around the front of the platen, and for retaining said record material in place against said platen during operation of the printing mechanism, said chute and said retaining means movable from front-feed guiding position to retaining position and vice versa; means for moving the retaining means from front-feed guiding position to retaining position and vice versa; yieldable means to connect the chute to the retaining means for normal concert operation, said yieldable means permitting said chute to be moved independently of said retaining means to a line finding position, for use in locating the record material in relation to the printing mechanism; and means to guide the chute when moving independently of the retaining means to line finding position.

24. In a machine of the class described, having printing mechanism, a traveling paper carriage, movable to various preselected columnar positions, and a platen mounted on said carriage, said platen being at all times located in printing position with respect to the printing mechanism, the combination of means on the carriage which is movable relatively to the platen for enabling record material to be front-fed into said carriage, said means having an open-throat position for receiving the record material, and a closed-throat position for holding the record material in printing position on said platen; means for moving the enabling means from one of said positions to the other of said positions; a power-driven shaft; a two-step clutch device operable to connect the moving means to the power-driven shaft for operation thereby, said clutch device being effective the first time it is operated to cause said throat mechanism to be moved from its open-throat position to its closed-throat position, and being effective the next time it is operated to cause said throat mechanism to be moved from its closed-throat position to its open-throat position; and means including a control slide positioned by the traveling carriage in preselected columnar positions thereof and a sensing device coacting with said control slide to render the clutch device operable.

References Cited in the file of this patent

UNITED STATES PATENTS

| | | |
|---|---|---|
| 1,170,708 | Thieme | Feb. 8, 1916 |
| 1,790,298 | Baumgarten et al. | Jan. 27, 1931 |
| 2,038,716 | Christian | Apr. 28, 1936 |
| 2,060,954 | Sundstrand | Nov. 17, 1936 |
| 2,081,423 | Crosman | May 25, 1937 |
| 2,084,519 | Anderson | June 22, 1937 |
| 2,121,853 | Bower | June 28, 1938 |
| 2,182,110 | Anderson | Dec. 5, 1939 |
| 2,503,805 | Davidson et al. | Apr. 11, 1950 |
| 2,536,525 | Anderson | Jan. 2, 1951 |

UNITED STATES PATENT OFFICE
CERTIFICATE OF CORRECTION

Patent No. 2,805,748 — September 10, 1957

Raymond A. Christian et al.

It is hereby certified that error appears in the printed specification of the above numbered patent requiring correction and that the said Letters Patent should read as corrected below.

Column 2, lines 26 and 42, for "Fig.", each occurrence, read -- Figure --; line 55, for "right-hand" read -- right-side --; column 4, line 50, for "prespective" read -- perspective --; column 5, line 18, for "plate" read -- plates --; column 6, line 66, for "casing" read -- casting --; column 7, line 1, for "nuts" read -- cuts --; column 8, line 25, for "the letter" read -- a letter --; column 9, line 27, for "mechanims" read -- mechanisms --; column 13, line 60, for "machinery" read -- machine --; column 14, line 72, for "serration" read -- serrations --; column 26, line 42, for "ot the" read -- to the --; line 60, for "link 260" read -- link 2260 --; column 27, line 46, for "pivotaly" read -- pivotally --; line 57, for "to ben" read -- to be --; column 30, lines 4 and 5, for "slotter" read -- slotted --; line 69, for "level" read -- lever --; column 31, line 47, for "acounts" read -- accounts --; column 40, line 12, after "device" change the semi-colon to a comma; line 65, for "the pressure" read -- said pressure --.

Signed and sealed this 26th day of November 1957.

(SEAL)

Attest:

KARL H. AXLINE
Attesting Officer

ROBERT C. WATSON
Commissioner of Patents